(12) United States Patent
Bertry et al.

(10) Patent No.: US 6,902,816 B1
(45) Date of Patent: Jun. 7, 2005

(54) SILICONE COMPOSITION USED IN THE PRODUCTION OF ANTIFRICTION VARNISHES, METHOD FOR THE APPLICATION OF SAID VARNISHES TO A SUPPORT AND SUPPORT THUS TREATED

(75) Inventors: Jean-Louis Bertry, Lyons (FR); Jean-Marc Frances, Meyzieu (FR); Fabrice Bohin, Paris (FR); Christian Priou, Princeton, NJ (US)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/958,179

(22) PCT Filed: Apr. 5, 2000

(86) PCT No.: PCT/FR00/00861
§ 371 (c)(1),
(2), (4) Date: Mar. 6, 2002

(87) PCT Pub. No.: WO00/59992
PCT Pub. Date: Oct. 12, 2000

(30) Foreign Application Priority Data

Apr. 6, 1999 (FR) .............................................. 99 04421

(51) Int. Cl.$^7$ .............................................. B32B 25/20
(52) U.S. Cl. ....................... 428/447; 428/448; 528/901; 528/37; 528/32; 528/21; 528/23; 528/17; 528/18; 522/25; 522/66; 525/477
(58) Field of Search ................................ 428/447, 448; 528/901, 37, 32, 21, 23, 17, 18; 522/25, 66; 525/477

(56) References Cited

U.S. PATENT DOCUMENTS

| | | | | |
|---|---|---|---|---|
| 5,340,898 A | * | 8/1994 | Cavezzan et al. .............. | 528/19 |
| 5,516,823 A | * | 5/1996 | Gentle et al. | |
| 5,658,674 A | * | 8/1997 | Lorenzetti et al. .......... | 428/447 |
| 5,693,688 A | * | 12/1997 | Priou .......................... | 522/25 |

FOREIGN PATENT DOCUMENTS

| | | | |
|---|---|---|---|
| EP | 0 562 922 | * | 9/1993 |
| EP | 0 702 106 | * | 3/1996 |
| EP | 0 903 385 | * | 3/1999 |
| FR | 2719598 | * | 11/1995 |
| FR | 2724660 | * | 3/1996 |
| FR | 2757870 | * | 7/1998 |
| WO | WO 95/19394 | * | 7/1995 |
| WO | 97/35924 | * | 10/1997 |

* cited by examiner

*Primary Examiner*—Kuo-Liang Peng
(74) *Attorney, Agent, or Firm*—James C. Lydon

(57) ABSTRACT

The invention relates to silicone compositions that are used in the production of varnishes that can be applied to supports in order to reduce the friction coefficient. The inventive composition comprises at least one polyorganosiloxane A (POS) which can be cationically and radically cross-linked by functional cross-linking groups (GFR) and a primer C chosen from onium borates, characterized in that the inventive composition also comprises molecules (POS D) which are substituted by secondary functional groups (GFS) carried by silicon atoms and selected from those that include at least one alkoxy and/or epoxy and/or carboxy motif and optionally a charge (e.g. silica). The invention can be used with anti-friction varnishes for RTV silicone coatings for material used in air bags, thermal transfer ribbons or packing films.

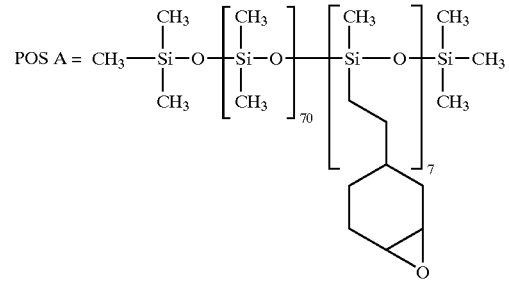

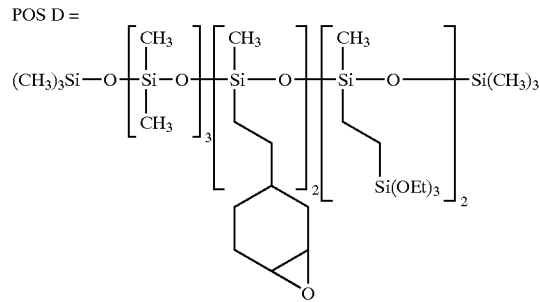

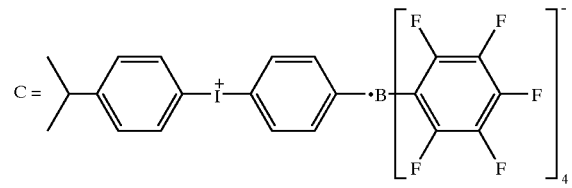

22 Claims, No Drawings

SILICONE COMPOSITION USED IN THE PRODUCTION OF ANTIFRICTION VARNISHES, METHOD FOR THE APPLICATION OF SAID VARNISHES TO A SUPPORT AND SUPPORT THUS TREATED

This application is a U.S. National Stage of International Application PCT/FR00/00861, filed Apr. 5, 2000 and published on Oct. 12, 2000 in the French language, and which claims priority of French Patent Application 99/04421, filed Apr. 6, 1999.

TECHNICAL FIELD

The general field of the invention is that of polymer coatings or varnishes capable of conferring anti-friction properties on substrates. More precisely, the invention relates to silicone compositions useful in particular for the production of varnishes which can be applied to supports whose coefficient of friction it is sought to reduce. The supports in question are varied and may consist in particular:
- of woven or nonwoven fibrous substrates coated with at least one layer for protection or for mechanical reinforcement, based on a coating polymer of the silicone elastomer type for example;
- of polymer substrates, in particular plastic films such as for example:
  thermal transfer ribbons which can be used in particular as support for ink in thermal transfer printers,
  or protective wrapping films, The present invention also relates to the methods for applying the anti-friction varnish to which it relates, to various supports.

Finally, the subject of the invention is the supports coated with such anti-friction varnishes and, in particular:
- textile fabrics coated with an elastomer layer onto which the anti-friction varnish is applied, such fabrics being capable of being used for the manufacture of bags for the personal protection of the occupants of vehicles, also called air bag,
- thermal transfer ribbons consisting for example of plastic films (e.g. made of polyester) carrying ink and which can be used in thermal transfer printers,
- protective wrapping films.

PRIOR ART

The general problem forming the basis of the invention is the development of an anti-friction silicone varnish. This problem of reducing coefficients of friction is posed with particular intensity for substrates coated with crosslinked elastomeric silicone coatings. Indeed, it is well known to persons skilled in the art that coating layers made of elastomeric silicone have a sticky feel which is damaging for numerous applications.

As regards more precisely the air bag application, it is known that these inflatable bags for the personal protection of the occupants of vehicles are made from a synthetic fiber fabric, for example made of polyamide (nylon®), coated on at least one of its sides with a layer of an elastomer which may be a silicone elastomer which is cold crosslinkable or vulcanizable by polyaddition (CVEII), polycondensation (CVEI), a silicone elastomer which is hot crosslinkable or vulcanizable by polycondensation with peroxide or by polyaddition (HVE) or a viscous silicone elastomer which is crosslinkable or vulcanizable by polyaddition of the LSR type.

This protective coating for example made of silicone is at least internal and makes it possible to guard against the effects of the explosion from the inflating of the bag. The fact that the elastomeric silicone coating has a sticky feel constitutes an impediment on the opening of the bag. Improving the efficiency of the air bags therefore involves making them from a coated material with a low coefficient of friction.

For further details on air bags for personal protection, reference may be made in particular to French patent No. 2 668 106 and more especially to French patent No. 2 719 598 for air bags coated with an RTV silicone elastomer which is crosslinkable by polyaddition.

This search for a low coefficient of friction for coatings on substrates coated or otherwise with silicone elastomer is also a concern in other applications such as, for example, coatings for thermal transfer ribbons (e.g. made of polyester) or protective wrapping films (e.g. made of polyethylene or made of polypropylene).

The thermal transfer ribbons can be used in thermal transfer printers. These thermal transfer ribbons are very thin (a few microns) and are coated, on one. of their surfaces, with a layer of ink (waxes or resins) and on the other surfaces, with a protective coating. A very thin protective coating having a thickness of between 0.1 and 1 micrometer is generally used to protect the surface of the film and to improve the impact of the printing head without deforming the transfer of the ink onto the applied support.

In printers whose printing speed is between 150 and 300 mm/s, it is very important for the printing head (flat or wedge-shaped), when it strikes the protective coating of the ribbon, to slide on the surface of the coating, at a high temperature of between 100 and 200° C.

As regards protective wrapping films, it is sometimes envisaged to apply on them a silicone-based top varnish in order to confer anti-adhesion properties on them.

However, it is advisable for this top varnish to possess a slipperiness which is at least equivalent to that of the starting plastic film (imprinted or otherwise).

BRIEF DISCLOSURE OF THE INVENTION

Faced with this problem, one of the essential objectives of the present invention is to propose to reduce the coefficient of friction of the substrate which may be coated with a coating layer, for example made of silicone, using an anti-friction varnish.

Another essential objective of the present invention is to provide an anti-friction varnish which can be easily applied to various types of substrates.

Another essential objective of the invention is to provide a crosslinkable anti-friction varnish which is easy and economical to use.

Another essential objective of the invention is to provide a silicone composition which can be used in particular for the production of an anti-friction varnish of the type mentioned above.

Another essential objective of the present invention is to provide a silicone composition which is useful in particular for the production of an anti-friction varnish, it being necessary for this composition to have a reasonable cost price and to be simple to prepare.

Another essential objective of the invention is to provide an anti-friction varnish consisting of a crosslinkable silicone composition, capable of significantly reducing the coefficient of friction of various types of coated or uncoated substrates.

Another objective of the invention is to provide a simple and economical method of applying an anti-friction varnish based on a silicone composition to various supports consisting, for example, of woven or nonwoven fibrous substrates and optionally coated, for example, with a layer of crosslinked silicone elastomer.

Another essential objective of the invention is to provide a fabric coated with crosslinked silicone elastomer intended for the manufacture of air bags, it being necessary for such a fabric to have a low coefficient of friction.

Another essential objective of the invention is to provide a fabric coated with a crosslinked elastomeric silicone for the manufacture of air bags, coated with an anti-friction varnish based on a silicone composition.

Another essential objective of the invention is to provide a fibrous support, for example a fabric, coated with a crosslinked elastomeric coating and endowed with a static coefficient of friction (Ks) corresponding to the force necessary to initiate the movement of a rectangular mass covered with the fabric in question on a flat glass support at a value of Ks≦1, for a coating deposit all layers sticking together D<20 g/m².

These objectives, among others, are achieved by the present invention which relates, in the first place, to a silicone composition useful in particular for the production of varnish having in particular anti-friction properties, this composition being of the type comprising at least one polyorganosiloxane (POS) which can be crosslinked by means of crosslinking functional groups (CFG) by the cationic and/or free-radical route and an effective quantity of a cationic initiator system comprising, as thermal initiator and/or photoinitiator, a product chosen from the onium salts of an element of groups 15 to 17 of the Periodic Table [Chem & Eng. News, vol. 63, No. 5, of 4 February 1985] or the salts of an organometallic complex of an element of groups 4 to 10 of the Periodic Table [same reference], whose cationic entity is selected from:

1) the onium salts of formula (I):

$$[(R^1)_n-A-(R^2)_m]^+ \quad (I)$$

in which formula:
A represents an element of groups 15 to 17 such as for example: I, S, Se, P or N,
$R^1$ represents a carbocyclic or heterocyclic $C_6$–$C_{20}$ aryl radical, it being possible for said heterocyclic radical to contain, as heteroelements, nitrogen or sulfur;
$R^2$ represents $R^1$ or a linear or branched $C_1$–$C_{30}$ alkyl or alkenyl radical, said radicals $R^1$ and $R^2$ being optionally substituted with a $C_1$–$C_{25}$ alkoxy, $C_1$–$C_{25}$ alkyl, nitro, chloro, bromo, cyano, carboxyl, ester or mercapto group;
n is an integer ranging from 1 to v+1, v being the valency of the element A,
m is an integer ranging from 0 to v−1 with n+m=v+1, 2) the oxoisothiochromanium salts described in patent application WO 90/11303, in particular the sulfonium salt of 2-ethyl-4-oxoisothiochromanium or of 2-dodecyl-4-oxoisothiochromanium, 3) the sulfonium salts in which the cationic entity comprises:

3.1. at least one polysulfonium species of formula III.1.

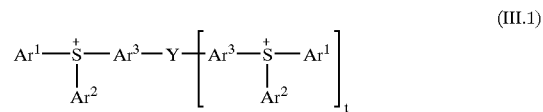

(III.1)

in which:
the symbols $Ar^1$, which may be mutually identical or different, each represent a mono-valent phenyl or naphthyl radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group, an ester group —COO-alkyl where the alkyl portion is a linear or branched $C_1$–$C_{12}$, preferably $C_1$–$C_6$, residue, and a group of formula —$Y^4$—$Ar^2$ where the symbols $Y^4$ and $Ar^2$ have the meanings given just below,
the symbols $Ar^2$, which may be mutually identical or different or with $Ar^1$, each represents a monovalent phenyl or naphthyl radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group, an ester group —COO-alkyl where the alkyl portion is a linear or branched $C_1$–$C_{12}$, preferably $C_1$–$C_6$, residue,
the symbols $Ar^3$, which may be mutually identical or different, each represent a divalent phenylene or naphthylene radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group, an ester group —COO-alkyl where the alkyl portion is a linear or branched $C_1$–$C_{12}$, preferably $C_1$–$C_6$, residue,
t is an integer equal to 0 or 1,
with the additional conditions according to which:
when t=0, the symbol Y is then a monovalent radical $Y^1$ representing the group of formula:

$Y^1$:

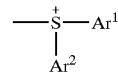

where the symbols $Ar^1$ and $Ar^2$ have the meanings given above,
when t=1:
on the one hand, the symbol Y is then a divalent radical having the following meanings $y^2$ to $Y^4$:
$Y^2$: a group of formula:

where the symbol $Ar^2$ has the meanings given above,
$Y^3$: a single valency bond, Y⁴: a divalent residue chosen from:

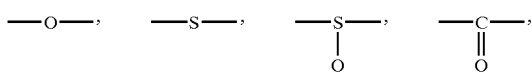

a linear or branched $C_1$–$C_{12}$, preferably $C_1$–$C_6$, alkylene residue, and a residue of formula —Si$(CH_3)_2$O—, on the other hand, in the case solely where the symbol Y represents Y³ or Y⁴, the radicals Ar¹ and Ar² (terminal) possess, in addition to the meanings given above, the possibility of being linked to each other by the residue Y' consisting in Y'¹ a single valency bond or in Y'² a divalent residue chosen from the residues cited in relation to the definition of Y⁴, which is seated between the carbon atoms, facing one another, situated on each aromatic ring at the ortho position with respect to the carbon atom directly linked to the cation S⁺;

3.2. and/or at least one mono-sulfonium species possessing a single cationic center S⁺ per mol of cation and consisting in most cases in species of formula:

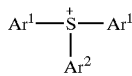

(III.2)

in which Ar¹ and Ar² have the meanings given above in relation to formula (III.1), including the possibility of directly linking to one another only one of the radicals Ar¹ to Ar² in the manner indicated above in relation to the definition of the additional condition which applies when t=1 in formula (III.I), involving the residue Y';

4) the organometallic salts of formula (IV):

$(L^1L^2L^3M)^+q$ (IV)

in which formula:

M represents a metal of group 4 to 10, in particular iron, manganese, chromium, cobalt and the like $L^1$ represents 1 ligand linked to the metal M by π electrons, a ligand chosen from the ligands η³-alkyl, η⁵-cyclopendadienyl and η⁷-cycloheptatrienyl and the η⁶-aromatic compounds chosen from the optionally substituted η⁶-benzene ligands and the compounds having from 2 to 4 fused rings, each ring being capable of contributing to the valency layer of the metal M by 3 to 8 π electrons;

$L^2$ represents a ligand linked to the metal M by π electrons, a ligand chosen from the ligands η⁷-cycloheptatrienyl and the η⁶-aromatic compounds chosen from the optionally substituted η⁶-benzene ligands and the compounds having from 2 to 4 fused rings, each ring being capable of contributing to the valency layer of the metal M by 6 or 7 π electrons;

$L^3$ represents from 0 to 3 identical or different ligands linked to the metal M by σ electrons, ligand(s) chosen from CO and $NO_2^+$; the total electron charge q of the complex to which $L^1$, $L^2$ and $L^3$ contribute and the ionic charge of the metal M being positive and equal to 1 or 2;

the anionic entity having the formula:

$[X^1X^2_aR_b]^-$ in which formula:
a and b are integers ranging, for a, from 0 to 6 and, for b, from 0 to 6 with a+b≧2;

the symbols $X^1$ represent elements chosen from groups IIIA, IVA, VA of the Periodic Table, preferably from the group comprising: B, P and Sb;

the symbols $X^2$ represent:
a halogen atom (chlorine, fluorine) with a=0 to 3,
an OH functional group with a=0 to 2, the symbols R are identical or different and represent:
a phenyl radical substituted with at least one electron-attracting group such as for example $OCF_3$, $CF_3$, $NO_2$, CN, and/or with at least 2 halogen atoms (fluorine most particu-larly), and this being when the cationic entity is an onium of van element of groups 15 to 17, a phenyl radical substituted with at least one element or one electron-attracting group, in particular a halogen atom (fluorine most particularly), $CF_3$, $OCF_3$, $NO_2$, CN, and this being when the cationic entity is an organo-metallic complex of an element of groups 4 to 10 an aryl radical contain-ing at least two aromatic nuclei such as for example biphenyl, naphthyl, optionally substituted with at least one element or one electron-attracting group, in particular a halogen atom (fluorine most particularly), $OCF_3$, $CF_3$, $NO_2$, CN, regardless of the cationic entity;

this composition being characterized in that it comprises, in addition, molecules substituted with secondary functional groups (SFG) carried by at least one silicon atom per molecule and preferably selected from those comprising at least one alkoxy and/or enoxy and/or carboxyl unit.

The silicone varnish composition according to the invention is advantageous in that it can be easily and industrially crosslinked by the cationic and/or free-radical route, by exposing to a beam of electrons and/or to actinic radiation of the UV type and/or by thermal activation. Once applied and crosslinked on a support, this varnish confers significant antifriction characteristics thereon.

These advantageous results stem from the judicious selection of a silicone varnish composition comprising compounds in which the silicon atoms (POS-silanes) carry crosslinking functional groups CFG as well as functional groups SFG, advantageously of alkoxy and/or enoxy and/or carboxyl type. The SFGs have a significant role in providing the antifriction properties to the coating composition. The fact that this silicone varnish composition can be easily applied and crosslinked on a support, for example a fabric or a plastic film, also stems from the use of a specific photo-initiator family of the type described in French patent application No. 96 16237 whose entire content is included by reference in the present application. Such photoinitiators allow rapid and complete photocrosslinking of the varnish.

DETAILED DISCLOSURE OF THE INVENTION

According to a first embodiment of the invention, the silicone varnish composition comprises:

A—at least one POS carrying CFGs, the latter being preferably chosen from the groups comprising at least one ethylenically unsaturated functional group—advantageously acrylate and/or alkenyl ether—and/or epoxide and/or oxethane;

B—at least one silane and/or one POS carrying SFGs, the latter preferably representing at least 0.5% and more preferably still at least 1% by weight of B;

C—at least one photoinitiator system as defined above.

In this first embodiment, the CFGs, on the one hand, and the SFGs, on the other hand, are carried by different molecules or macromolecules based on silicon.

The alternative which corresponds to the second embodiment of the invention is that these silicon-based molecules are substituted both with CFG groups and with SFG groups. In this case, the silicone varnish composition according to the invention comprises:

C—at least one photoinitiator system as defined above,
D—at least one POS carrying CFGs and SFGs, the CFGs being preferably chosen from groups comprising at least one ethylenically unsaturated functional group—advantageously acrylate and/or alkenyl ether—and/or epoxide and/or oxethane;

Naturally, it is not impossible for the composition according to the invention to comprise the POSs and/or the silanes A, B, D, together.

These hardening (for example under UV and/or under a beam of electrons) varnish compositions providing surface antifriction properties may comprise in addition:

F—optionally at least one organic reactive diluent chosen from organic resins of the epoxide and/or vinyl ether and/or oxethane type;
G—optionally at least one organic or inorganic pigment;
H—optionally a filler, preferably a silicic filler;
I—optionally at least one photosensitizer, preferably selected from (poly)aromatics (optionally metallic) and/or heterocyclics.

Entering into detail on the nature of the various constituents of the silicone varnish composition according to the invention, it will be specified, as regards the POSs A, that they are preferably epoxysilicones and/or vinyl ether silicones which are:

either linear or substantially linear and consist of units of formula (II.1), ending with units of formulae (II.2) or cyclic and consisting of units of formula (11.1):

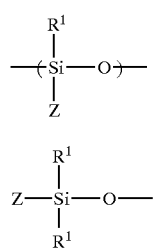

in which formulae:
the symbols $R^1$ are similar or different and represent:
either a linear or branched $C_1$–$C_6$ alkyl radical optionally advantageously substituted with one or more halogens, the preferred optionally substituted alkyl radicals being: methyl, ethyl, propyl, octyl and 3,3,3-trifluoropropyl,
or an optionally substituted $C_5$–$C_8$ cycloalkyl radical,
or an aryl or aralkyl radical optionally substituted: in particular with halogens and/or alkoxyls, the phenyl, xylyl, tolyl and dichlorophenyl radicals being most particularly selected,
and, more preferably still, at least 60 mol % of the $R^3$ radicals being methyls,
the symbols Z are similar or different and represent:
either the radical $R^1$,
or a CFG group corresponding to an epoxide or vinyl ether residue linked to the silicon by means of a divalent radical advantageously containing from 2 to 20 carbon atoms optionally comprising a heteroatom,
at least one of the symbols Z corresponding to a CFG group.

As examples of organofunctional CFG groups of the epoxy type, there may be mentioned those of the following formula:

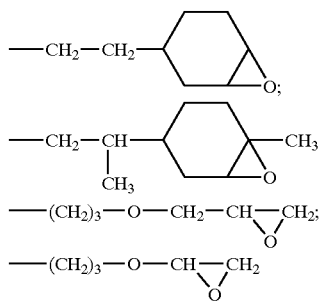

As regards the organofunctional CFG groups of the vinyl ether type, there may be mentioned, e.g., those contained in the following formulae;

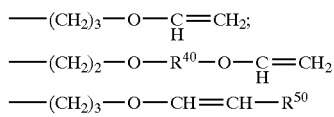

☐ with $R^{40}$=
optionally substituted linear or branched $C_1$–$C_{12}$ alkylene,
or arylene, preferably phenylene, optionally substituted preferably with one to three $C_1$–$C_6$ alkyl groups;
with $R^{50}$=linear or branched $C_1$–$C_6$ alkyl.

The preferred epoxy or vinyloxyfunctional polyorganosiloxanes are described in particular in patents DE-A-4 009 889; EP-A-0 396 130; EP-A-0 355 381; EP-A-0 105 341; FR-A-2 110 115; FR-A-2 526 800.

The functional epoxy polyorganosiloxanes may be prepared by hydrosilylation reaction between oils with Si-H units and epoxyfunctional compounds, such as 4-vinylcyclohexene oxide, allyl glycidyl ether and the like.

The vinyloxyfunctional polyorganosiloxanes may be prepared by hydrosilylation reaction between oils with Si-H units and vinyloxyfunctional compounds, such as allyl vinyl ether, allyl-vinyloxyethoxybenzene and the like.

More preferably still, the POSs A are epoxysilicones of the following formulae (A.I) (A.II):

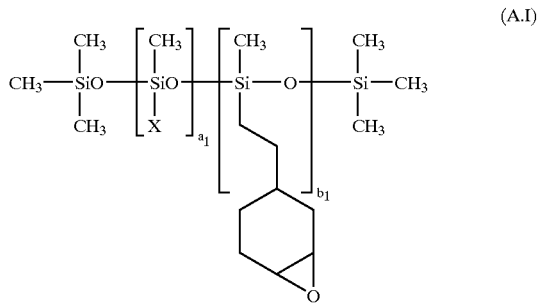

with X=$CH_3$; Phenyl; Cycloalkyl; $C_1$–$C_{18}$ alkyl; alkenyl; —OH; H; $CH_2$—$CH_2$—$CH_2$—OH; $CH_2$—$CH_2$—$CF_3$; —$(CH_2)_n$—$CF_3$, n=1 to 20;

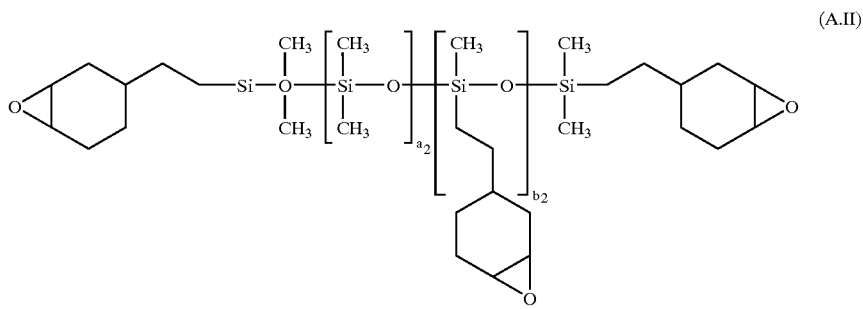

(A.II)

$a_1$, $a_2$ and $b_1$, $b_2$ being defined as below in these formulae (A.I) and (A.II)

$$1 \leq a_1, a_2 \; 1 \leq b_1, b_2$$

preferably $1 \leq a_1$, $a_2 \leq 5000$ $1 \leq b_1$, $b_2 \leq 500$ and more preferably still $1 \leq a_1$, $a_2 \leq 1000$ $1 \leq b_1$, $b_2 \leq 100$;

$a_2$, $b_2$ being=0 in formula (A.II) to give the epoxydized disiloxane (A.III).

According to another advantageous characteristic of the invention, the POS(s) (A) has (have) a viscosity η (expressed in mPa.s at 25° C.) of between:

200 and 3000, preferably 300 and 2000, and more preferably still between 400 and 900.

These viscosity values relate both to the linear POSs and the cyclic POSs which are capable of being used in accordance with the use according to the invention.

The dynamic viscosity at 25° C. of all the silicone polymers considered in the present disclosure may be measured using a BROOKFIELD viscometer, according to the AFNOR standard NFT 76 102 of February 1972.

The viscosity in question in the present disclosure is the dynamic viscosity at 25° C., called "Newtonian" viscosity, that is to say the dynamic viscosity which is measured, in a manner known per se, at a sufficiently low shearing speed gradient for the measured viscosity to be independent of the speed gradient.

In accordance with the invention, it is perfectly possible to envisage using a mixture of various POSs A with units of formulae (II.1) and (II.2), as defined above (linear and/or cyclic).

As regards the compound(s) B, it is advantageous in accordance with the invention that it/they is/are chosen from that (or those) of the following formula B:

in which:

x=0, 1, 2 or 3 y=1, 2, 3 or 4 the radicals $R^2$ are mutually identical or different and correspond to a linear or branched alkyl, a cycloalkyl, a hydroxyl, a hydrogen, a vinyl, a —$CF_3$, a —$(CH_2)_m$—$CF_3$ with m=1 to 50, the SFGs are mutually identical or different and correspond to an alkoxy, preferably: —$OR^3$ with $R^3$ representing a linear or branched $C_1$–$C_{30}$ alkyl or a cycloalkyl; —$(OR^4)_p$—$OR^5$; —$(R^6)_q$—$Si(OR^7)_r(R^8)_t$ with $R^4$, $R^7$, $R^8$ mutually identical or different and having the same definition as that given above for $R^3$ and with $R^6$ mutually identical or different and preferably corresponding to an alkylene (advantageously a methylene);

p, q=1 to 50, preferably 1 to 10;

r=1, 2 or 3 and t=0, 1 or 2;

an enoxy, preferably:

—O—CH=CH—$R^8$;

—$(R^9)_u$—Si(OCH=CHR$^{10}$)$_v$(R$^{11}$)$_w$;

with $R^8$, $R^{10}$, $R^{11}$ mutually identical or different and having the same definition as that given above for $R^3$, and with $R^9$ having the same definition as that given above for $R^6$;

u=1 to 50, preferably 1 to 10, v=1, 2 or 3 and w=0, 1 or 2;

a carboxyl, preferably:

—OCOR$^{12}$;

—$(R^{13})_z$—Si(OCOR$^{14}$)$_{z1}$(R$^{15}$)$_{z2}$;

with $R^{12}$, $R^{14}$ as defined above for $R^8{}_1$, $R^{10}$, $R^{11}$;

$R^{13}$ as defined above for $R^9$; and z=1 to 50, preferably 1 to 10, $z_1$=1, 2 or 3 and $z_2$=0, 1 or 2;

By way of example of POS B, there may be mentioned:

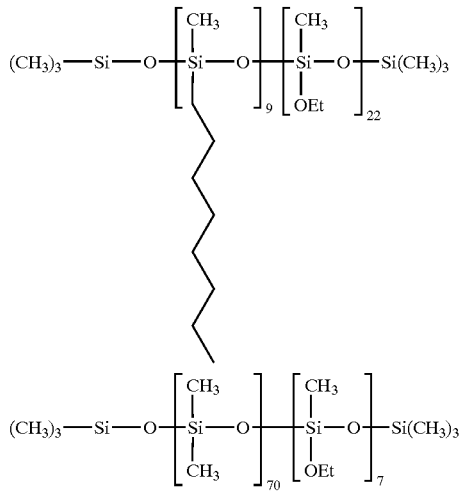

with Et=ethyl.

By way of example of silane B, there may be mentioned: MeSi(OEt)$_3$; Si(OEt)$_4$; PrSi(OEt)$_3$; OctSi(OMe)$_3$; PrSi(OMe)$_3$; and the like with Me=methyl; Et=ethyl; Pr=propyl, Oct=octyl.

In accordance with the second embodiment, mixed POSs D comprising both CFGs and SFGs are used. Without that being limiting, it is found that this second embodiment is more especially preferred. Thus, the POSs D used advantageously comprise SFGs as defined above and CFGs of the epoxide type.

More preferably still, said POS D corresponds to the POSs of the following formulae (D', D", D'''):

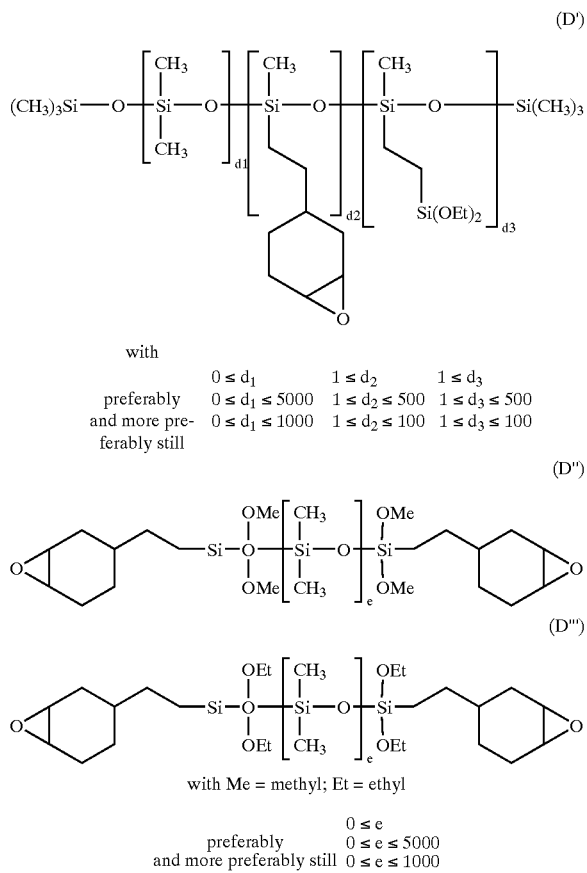

with

|  | $0 \le d_1$ | $1 \le d_2$ | $1 \le d_3$ |
|---|---|---|---|
| preferably | $0 \le d_1 \le 5000$ | $1 \le d_2 \le 500$ | $1 \le d_3 \le 500$ |
| and more preferably still | $0 \le d_1 \le 1000$ | $1 \le d_2 \le 100$ | $1 \le d_3 \le 100$ | with Me = methyl; Et = ethyl $0 \le e$
preferably $0 \le e \le 5000$
and more preferably still $0 \le e \le 1000$ In the case where the compound D is a silane comprising both CFGs of the (Meth)acrylate and/or vinyl ether and/or epoxide and/or oxethane—preferably epoxide—type—as well as SFGs—preferably of the alkoxy type—, it may include for example the following compounds:

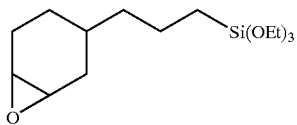

According to a preferred characteristic of the invention, the initiators C are e.g.: the onium borates described in European patent application No. 0 562 922 whose entire content is included by reference in the present application. More precisely still, there may be used in practice the initiator of the following formula:

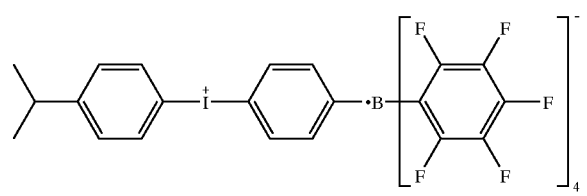

In practice, the initiators for the use according to the invention are prepared in a very simple manner by dissolving the onium borate or organometallic complex, preferably of onium, provided in solid (powder) form in a solvent.

According to one alternative relating to onium borate, the latter may be prepared directly in the solvent, from a salt (e.g. chloride) of the cation (iodonium) and a salt (for example of potassium) of the borate anion.

Preferably, it is envisaged in accordance with the use according to the invention that the initiator is used in solution in an organic solvent, preferably chosen from solvents which are proton donors and more preferably still from the following group: isopropyl alcohol, isobenzyl alcohol, diacetone alcohol, butyl lactate, esters, and mixtures thereof. As is claimed in French patent No. 2 724 660, organic solvents which are proton donors and which have an aromatic character (benzyl alcohol) behave as crosslinking accelerators. It is therefore advantageous to use them to dissolve the photoinitiator.

It should be specified that the expression effective catalytic quantity of photoinitiator is understood to mean, for the purposes of the invention, the quantity sufficient to initiate the crosslinking.

Since in practice—as indicated above—the photoinitiator is advantageously dissolved in a polar solvent, in a quantity such that its titer in the solution obtained is between 1 and 50% by weight, preferably between 10 and 30% by weight, and more preferably still between 15 and 25% by weight.

According to an advantageous feature of the use according to the invention, the incorporation of the photoinitiator in solution into the composition comprising the POS at a given molar content of FCG is carried out at the rate of 0.1 to 10% by weight of solution relative to the final mixture and preferably 0.5 to 5% by weight and more preferably of the order of 1% by weight.

According to one variant of the use in accordance with the invention, crosslinking inhibitors may be used which are preferably chosen from alkaline products, and more preferably still from alkaline products of the amine-containing type, for example of the type consisting of a silicone onto which at least one amine group, preferably a tertiary amine group, is grafted.

As regards the optional additives, there may be mentioned in relation to the optional reactive diluent E that the compounds of formula E' (epoxide) and E" (vinyl ether) are examples among others:

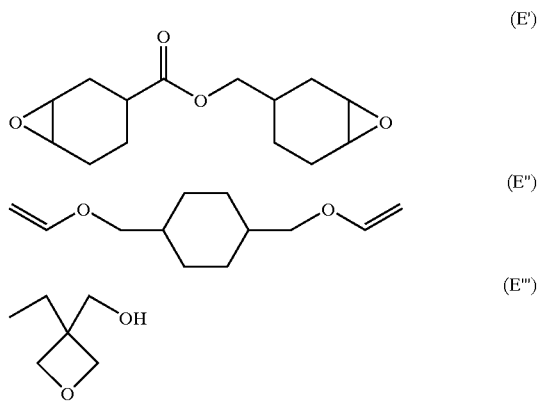

The optional inorganic or organic pigments F are added to give color to the silicone varnish according to the invention. In particular, this color makes it possible to recognize a nonvarnished fabric from a varnished fabric merely at a glance.

By way of examples of pigments, there may be mentioned carbon black; titanium dioxide; phthalocyanin; benzimidazolone; naphthols (BONA pigment lakes); diazopyrazolones; diarylide or monoarylide yellow pigments and the like.

The fillers G and in particular the silicic fillers may be for example pyrogenic silicas treated with hexamethyldisilasanes or with octamethylcyclotetra-siloxanes (specific surface area 300 m²/g), fumed silica.

These fillers may be inorganic or otherwise, e.g.: ground synthetic or natural fiber (polymers), calcium carbonate, talc, clay, titanium dioxide and the like.

As regards the optional photosensitizers H, they may be selected from (poly)aromatic products—optionally metallic—and heterocyclic products, and preferably from the list of the following products: phenothiazine, tetracene, perylene, anthracene, 9,10-diphenyl-anthracene, thioxanthone, benzophenone, acetophenone, xanthone, fluorenone, anthraquinone, 9,10-dimethyl-anthracene, 2-ethyl-9,10-dimethyloxyanthracene, 2,6-dimethylnaphthalene, 2,5-diphenyl-1-3-4-oxadiazole, xanthopinacol, 1,2-benzanthracene, 9-nitroanthracene, and mixtures thereof.

More especially, they may be a product H based on thioxanthone:

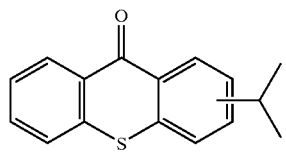

Taking into account its ease of production its low cost and its antifriction properties, the silicone varnish according to the invention may have uses in numerous fields of application and in particular in the field of the coating of woven or nonwoven fibrous supports.

It follows therefrom that the invention relates, according to another of its aspects, to the application of the composition as described above as antifriction varnish to a support, this support preferably comprising a substrate—advantageously fibrous (and more especially textile)—optionally coated with at least one silicone elastomer layer which is at least partially crosslinked.

Advantageously, this method of application essentially consists:

in coating a support with the varnish composition as defined above, and in exposing the surface thus coated to actinic radiation and/or to a beam of electrons and/or to heat, so as to cause the crosslinking of the varnish layer.

The means of applying the layer of noncrosslinked varnish to the support are of the type known and appropriate for this purpose (bar or roll for coating).

The same applies as regards the means of exposing, for example, to UV radiation and/or to the electron beams. Other details will be given in this regard in the examples which follow.

The present invention also relates to the varnish support endowed with antifriction properties, as obtained by the above-defined application.

According to a preferred embodiment of this varnish support, the latter comprises a substrate—preferably textile—coated on at least one of its surfaces with at least one layer of silicone elastomer which can be crosslinked or which is at least partially crosslinked, preferably chosen from:

the polyaddition or polycondensation RTV silicones,
and/or the peroxide HVE silicones,
and/or the polyaddition LSR silicones,
the antifriction varnish obtained from the composition as defined above being applied to the (top) layer(s) of silicone elastomer. The expressions RTV, LSR and HVE are well known to persons skilled in the art: RTV is the abbreviation for "room temperature vulcanizing"; LSR is the abbreviation for "liquid silicone rubber"; HVE is the abbreviation for hot vulcanizable elastomer.

In practice, the invention relates more precisely to the supports (for example textiles such as those used for the manufacture of air bags) coated on one and/or the other of their surfaces with a layer of crosslinked silicone elastomer RTV, HVE or LSR, itself coated with a coating of antifriction silicone varnish as defined above.

The problem of providing antifriction properties is particularly acute as regards these crosslinked silicone elastomer coatings since as already indicated above the latter have the characteristic of having a sticky feel.

The polyorganosiloxanes, principal constituents of the sticky layers of crosslinked elastomers onto which the varnish according to the invention may be applied, may be linear, branched or crosslinked, and may comprise hydrocarbon radicals and/or reactive groups such as for example hydroxyl groups, hydrolysable groups, alkenyl groups and hydrogen atoms. It should be noted that the polyorganosiloxane compositions are fully described in the literature and in particular in the book by Walter NOLL: "Chemistry and Technology of Silicones", Academic Press, 1968, 2nd edition, pages 386 to 409.

More precisely, these varnishable polyorganosiloxanes consist of siloxyl units of general formula:

$$R^o_{s_1} SiO_{\frac{s-n_1}{2}} \qquad (I')$$

and/or siloxyl units of formula:

$$Z^o_{s_1} R^o_{s_1} SiO_{\frac{s-x_1+y_1}{2}} \qquad (II')$$

in which formulae the various symbols have the following meaning:

the symbols R°, which are identical or different, each represent a group of a nonhydrolysable hydrocarbon nature, it being possible for this radical to be:
an alkyl radical, a haloalkyl radical having from 1 to 5 carbon atoms and comprising from 1 to 6 chlorine atoms and/or fluorine atoms,
cycloalkyl and halocycloalkyl radicals having from 3 to 8 carbon atoms and containing from 1 to 4 chlorine and/or fluorine atoms,
aryl, alkylaryl and haloaryl radicals having from 6 to 8 carbon atoms and containing from 1 to 4 chlorine and/or fluorine atoms,
cyanoalkyl radicals having from 3 to 4 carbon atoms;
the symbols Z°, which are identical or different, each represent a hydrogen atom, a $C_2$–$C_6$ alkenyl group, a hydroxyl group, a hydrolysable atom, a hydrolysable group;
$n_1$=an integer equal to 0, 1, 2 or 3;
$x_1$=an integer equal to 0, 1, 2 or 3;
$y_1$=an integer equal to 0, 1 or 2;
the sum x+y is between 1 and 3.

By way of illustration, there may be mentioned among the organic radicals R° directly linked to the silicon atoms: the groups methyl; ethyl; propyl; isopropyl; butyl; isobutyl; n-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,4,4,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-tri-fluorotolyl; xylyl like 2,3-dimethylphenyl, 3,4-dimethylphenyl.

Preferably, the organic radicals $R^o$ linked to the silicon atoms are methyl or phenyl radicals, it being possible for these radicals to be optionally halogenated or even cyanoalkyl radicals.

The symbols $Z^o$ may be hydrogen atoms, hydrolysable atoms such as halogen atoms, in particular chlorine atoms, vinyl or hydroxyl groups or hydrolysable groups such as for example: amino, amido, aminoxy, oxime, alkoxy, alkenyloxy, acyloxy.

The nature of the polyorganosiloxane and therefore the ratios between the siloxyl units (I') and (II") and the distribution thereof is, as is known, chosen according to the crosslinking treatment which will be carried out on the curable (or vulcanizable) composition with a view to its conversion to an elastomer.

It is possible to use a large variety of monocomponent or bicomponent compositions which can be crosslinked by polyaddition or polycondensation reactions, in the presence of a metal catalyst and optionally of an amine and of a crosslinking agent.

The bicomponent or monocomponent polyorganosiloxane compositions which crosslink at room temperature (RTV) or with heat (HVE) by polyaddition reactions, essentially by reaction of hydrogenosilylated groups with alkenylsilylated groups, in the presence generally of a metal catalyst, preferably platinum, are described for example in patents U.S. Pat. Nos. 3,220,972, 3,284,406, 3,436,366, 3,697,473 and 4,340,709. The polyorgano-siloxanes entering into these compositions consist in general of pairs based, on the one hand, on a linear, branched or crosslinked polysiloxane consisting of units (II) in which the residue $Z^o$ represents a $C_2$–$C_6$ alkenyl group and where $x_1$ is at least equal to 1, optionally combined with units (I'), and on the other hand on a linear, branched or crosslinked hydrogeno-polysiloxane consisting of units (II") in which the residue $Z_o$ then represents a hydrogen atom and where $x_1$ is at least equal to 1, optionally combined with units (I').

The bicomponent or monocomponent polyorganosiloxane compositions crosslinking at room temperature (RTV) by polycondensation reactions under the action of moisture, generally in the presence of a metal catalyst, for example a tin compound are described for example for the monocomponent compositions in patents U.S. Pat. Nos. 3,065,194, 3,542,901, 3,779,986, 4,417,042, and in patent FR-A-2 638 752, and for the bicomponent compositions in patents U.S. Pat. Nos. 3,678,002, 3,888,815, 3,933,729 and 4,064,096. The polyorganosiloxanes entering into these compositions are in general linear, branched or crosslinked polysiloxanes consisting of units (II') in which the residue $Z^o$ is a hydroxyl group or a hydrolysable group or atom and where $x_1$ is at least equal to 1, with the possibility of having at least one residue $Z^o$ which is equal to a hydroxyl group or to an atom or to a hydrolysable group and at least one residue $Z^o$ which is equal to an alkenyl group when $x_1$ is equal to 2 or 3, said units (II') being optionally combined with units (I'). Parallel compositions may contain in addition a crosslinking agent which is in particular a silane carrying at least three hydrolysable groups such as for example a silicate, an alkyltrialkoxysilane or an aminoalkyltri-alkoxysilane.

These RTV polyorganosiloxane compositions which crosslink by polyaddition or polycondensation reactions advantageously have a viscosity at 25° C. at most equal to 100000 mPa.s and preferably of between 10 and 50000 mPa.s.

It is possible to use RTV compositions which crosslink at room temperature by polyaddition or polycondensation reactions, having a viscosity at 25° C. greater than 100000 mPa.s, such as that situated in the interval ranging from a value greater than 100000 mPa.s to 300000 mPa.s; this feature is recommended when it is desired to prepare charged curable compositions in which the filler(s) used has (have) a tendency to separate by sedimentation.

It is also possible to use compositions which crosslink with heat by polyaddition reactions and more precisely so-called polyaddition HVE type compositions having a viscosity at 25° C. at least equal to 500000 mPa.s and preferably of between 1 million mPa.s and 10 million mPa.s and even more.

This may also include compositions curable at high temperature under the action of organic peroxides such as 2,4-dichlorobenzoyl peroxide, benzoyl peroxide, t-butyl perbenzoate, cumyl peroxide, di-t-butyl peroxide. The polyorganosiloxane or gum entering into such compositions (termed simply of the HVE type) then essentially consists of siloxyl units (I'), optionally combined with units (II') in which the $Z^o$ residue represents a $C_2$–$C_6$ alkenyl group and where x is equal to 1. Such HVEs are for example described in patents U.S. Pat. Nos. 3,142,655, 3,821,140, 3,836,489 and 3,839,266). These compositions advantageously have a viscosity at 25° C. at least equal to 1 million mPa.s and preferably of between 2 million and 10 million mPa.s and even more.

Other polyorganosiloxane compositions which can be varnished with the silicone varnish composition according to the invention are those, monocomponent or bicomponent, which crosslink with heat by polyaddition reactions, called LSR compositions. These compositions correspond to the definitions given above in relation to the preferred compositions called RTV, except as regards their viscosity which is situated, this time, in the interval ranging from a value greater than 100000 mPa.s to 500000 mPa.s.

Without this being limiting, the elastomeric silicone coatings onto which the varnish according to the invention may be applied in order to reduce their coefficient of friction, are more especially coatings obtained from compositions of silicone elastomers which are cold vulcanizable RTV, in particular of the bicomponent type (RTV 2), by polyaddition.

In a more preferred manner still, these silicone elastomer layers for coating are used in the coating of textile fabric for inflatable bags for the personal protection of the occupants of vehicles (air bag).

It results therefrom that another subject of the invention consists of the varnish support as defined above, characterized in that it is intended to be used for the manufacture of inflatable bags for the personal protection of the occupants of vehicles.

According to another of these subjects, the present invention also relates to an inflatable bag for the personal protection of the occupants of vehicles, characterized in that it is produced from abovesaid support.

In the context of this air bag application, the RTV elastomeric silicone coatings more particularly in question may be those belonging to the four groups (i) (ii) (iii) and (iv) as defined below.

(i) silicone elastomer composition for coating of the RTV 2 type comprising at least one POS I of the SiVi type, at least one POS II of the SiH type, a platinum-based hydrosilylation catalyst III, an adhesion promoter IV comprising at least one alkoxylated organosilane IV.1 containing per molecule at least one vinyl (vinyltrimethoxysilane) group, at least one organosilicon-containing compound IV.2 comprising at least one epoxy radical (3-glycidoxypropyltrimethoxysilane (GLYMO) and at least one chelate IV.3 of a metal M and/or a metal alkoxide (butyl titanate).

These polyaddition RTV silicone coatings for air bags are described in French patent No. 2 719 598 (No. 94 05 652).

(ii) Polyaddition RTV 2 silicone elastomer obtained from a composition comprising POSs type I SiVi and POSs type II SiH, as well as a particulate filler obtained by treatment using a compatibility-promoting agent introduced into the preparation medium: on the one hand, before and/or substantially simultaneously with the bringing into contact with a portion of the silicone oil used with a portion of the particulate filler, this introduction of compatibility-promoting agent being carried out once or several times for a fraction of compatibility-promoting agent represents at most 8% by dry weight of the total particulate filler;

and, on the other hand, after this POS/filler bringing into contact. The compatibility-promoting agent is hexamethyldisilasane HMDZ.

The oil SiVi is an $\alpha,\omega$-divinyl-containing polydimethylsiloxane and the oil II SiH is an $\alpha,\omega$-dihydrogeno polydimethylsiloxane and a polyhydrogeno oil PDMS. This RTV elastomer composition (ii) which can be crosslinked by polyaddition and comprises a particulate charge made compatible in a particular manner with HMDZ, is described in detail in French patent application No. 97 08 171.

(iii) RTV silicone elastomer coating crosslinked by polycondensation and comprising a silicic particulate filler treated using a compatibility-promoting agent introduced into the preparation medium, on the one hand, before and/or substantially simultaneously with the bringing into contact of a portion of the silicone oil used with a portion of the particulate filler, this introduction of compatibility-promoting agent being carried out once or several times for a fraction of compatibility-promoting agent represents at most 8% by dry weight of the total particulate filler;

and, on the other hand, after this POS/filler bringing into contact. The compatibility-promoting agent is hexamethyldisilasane HMDZ. These polycondensation RTV silicone coatings whose filler is treated in a specific manner with HMDZ, which are intended in particular for the coating of textile fabric for air bags, are described in French patent application No. 98 16 467 describing compositions comprising:

1—at least one linear reactive POS carrying at each chain end at least two condensable groups (other than OH) or which is hydrolysable, or a single hydroxyl group,
2—optionally at least one linear nonreactive POS carrying no condensable group, which is hydrolysable or a hydroxyl group,
3—optionally water,
4—a particulate reinforcing filler based on silica treated with a compatibility-promoting agent (hexamethyldisilazane), this compatibility-promoting agent being introduced into the composition before and after the incorporation of the reinforcing filler into at least a portion of the silicone material, the fraction of compatibility-promoting agent introduced before the incorporation of the filler representing from 8 to 30% by weight of the reinforcing filler used. (POS 1=polydimethylsiloxane$\alpha$,$\omega$-$(CH_3)_3SiO_{1/2}$; POS 2=polydimethylsiloxane$\alpha$,$\omega$-$(CH_3)_2OHSiO_{1/2}$);

(iv) RTV silicone elastomer coating crosslinked by polyaddition and obtained from a coating composition comprising:
(1) at least one polyorganosiloxane having, per molecule, at least two $C_2$–$C_6$ alkenyl groups linked to the silicon (e.g. PolyDimethylSiloxane (PDMS-$\alpha$,$\omega$ vinylated);
(2) at least one polyorganosiloxane having, per molecule, at least two hydrogen atoms linked to the silicon (e.g. PDMS $\alpha$,$\omega$ dihydrogeno and PDMS polyhydrogeno),
(3) a catalytically effective quantity of at least one catalyst composed of at least one metal belonging to the platinum group (e.g.: KARSTEDT 10% Pt)
(4) a ternary adhesion promoter consisting of:
(4.1.) at least one alkoxylated organosilane containing, per molecule, at least one $C_3$–$C_6$ alkenyl group (e.g.: $\gamma$-methacryloxypropylated trimethoxysilane)
(4.2.) at least one organosilicon-containing compound comprising at least one epoxy radical (e.g.: $\gamma$-glycidoxypropyl trimethoxysilane)
(4.3) at least one metal M chelate and/or one metal alkoxide of general formula: $M(OJ)n$, with n=valency of M and J=linear or branched $C_1$–$C_8$ alkyl, M being chosen from the group formed by: Ti, Zr, Ge, Li, Mn, Fe, Al and Mg (e.g.: butyl titanate).
(5) a reinforcing siliceous filler treated in situ with a compatibility-promoting agent (e.g.: HMDZ) in the presence of polyorganosiloxane (1),
(6) a so-called extending polyorganosiloxane having terminal siloxyl units with hydrogeno functional groups (e.g. PDMS $\alpha$,$\omega$-hydrogeno—RHODORSIL® 620 from RHODIA CHIMIE)
(7) optionally a neutralizing agent,
(8) optionally a crosslinking inhibitor and/or other additive(s) in use in this type of compositions (e.g.: ethynylcyclohexanol).
(9) and optionally expanded or expandable inorganic hollow microspherical fillers, in which method a suspension of reinforcing siliceous filler is prepared by bringing this siliceous filler into contact with the compatibility-promoting agent and polyorganosiloxane (1), which constitutes the in situ treatment of the filler.

All these crosslinkable and/or crosslinked RTV elastomeric silicone compositions are prepared in a conventional manner (bicomponent precursor system) and are described for example in French patent No. 2 719 598, as regards the RTVs(iv).

Once the bicomponent impasting has been carried out, it is applied to the support by any appropriate means of coating, for example, a scraper or a roller. The crosslinking of the layer coated onto the support may be caused, for example, by the thermal route and/or by UV radiation.

The support thus coated may be a flexible material such as, for example, an advantageously woven fibrous support made of synthetic fibers, e.g. polyester or polyamide. Such coated tissues may be used for the manufacture, by sewing, of an inflatable bag for an automobile (air bag).

Once the support has been coated with the crosslinked RTV elastomer layer, the antifriction silicon varnish is applied in accordance (with the invention and then the crosslinking of said varnish is carried out by exposure to actinic radiation or to electron beams. In addition to the textile supports coated with silicone, the antifriction varnish according to the invention may be applied:

- to plastic films (e.g. made of polyester) such as thermal transfer ribbons for printers of the same name,
- or to protective wrapping plastic films (e.g. made of polyethylene or of polypropylene).

In these two applications, the antifriction varnish according to the invention will promote the sliding of at least one of the surfaces of the plastic film, it being possible for this surface to be coated with at least one silicone layer.

The examples which follow describe:

the preparation of the antifriction varnish compositions according to the invention, the application of the latter:
to fabric supports coated with a polyaddition RTV crosslinked silicone elastomer,
to thermal transfer ribbons comprising a polyester film of a few microns,
and to polyethylene wrapping films.
and the evaluation of the samples thus obtained in terms of coefficient of friction,

EXAMPLES

In the examples which follow, the production of formulations which can be directly exploited for the production of UV varnish for air bags is described.

Examples 1 to 14

Photocrosslinkable varnish formulations are prepared from the following polymers:

A/

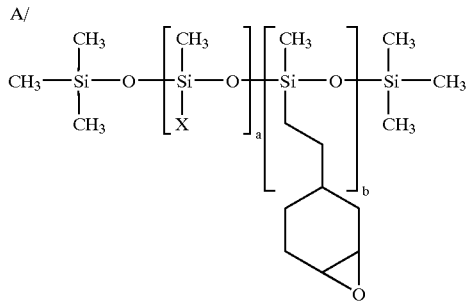

A₁/SILCOLEASE® UV POLY200: x=CH₃; a=70; b=7
A₂/SILCOLEASE® UV POLY201; x=CH₃; a=444; b=35

D₁/

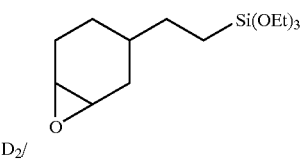

D₂/

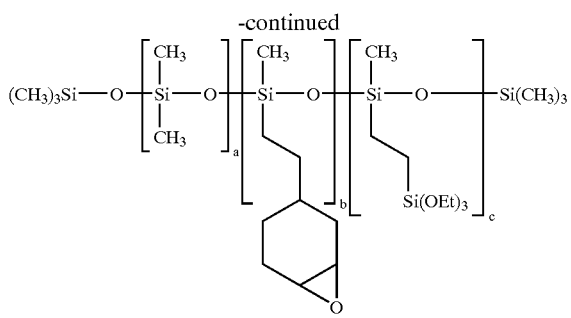

a = 9; b = 2; c = 2

C₂/

Photoinitiator SILCOLEASE® UV CATA 211

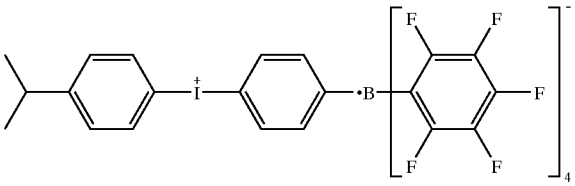

Photoinitiator RHODORSIL® Photoinitiator 2074
G2/ Aerosil silica having a specific surface area of 300 m²/g from DEGUSSA treated with octamethylcyclotetrasiloxane
Red 22/red pigment marketed by SUN CHEMICAL.

These compositions are then applied with the aid of coating bars numbered differently from 0 to 6 in order to deposit from 1 to 20 g/m² on a rectangle of polyamide fabric comprising a silicone elastomer at the surface of the crosslinked polyaddition RTV type (140 g/m²)

40 kg of an α,ω-divinylated silicone oil having a viscosity of 1.5 Pa.s with a titer of 0.1 meq of vinyl (Vi) per gram of oil, 0.24 kg of potable water and 0.24 kg of hexamethyldisilazane are introduced into a 100 l arm mixer. After homogenization, 13.9 kg of a pyrogenic silica characterized by its specific surface area of 200 m²/g are added in portions over roughly 2 hours. After about 1 hour of mixing, 2.27 kg of hexamethyldisilazane are added over roughly 1 hour. 2 hours later, a heating phase is started during which the mixture is placed under a nitrogen stream (30 m³/h); the heating continues until about 140° C. is reached, a plateau temperature which is maintained for 2 hours in order to remove the volatile materials from the composition. The suspension is then allowed to cool.

Starting with this suspension, a portion A and a portion B are formulated in appropriate reactors.

Portion A contains:
320 g of the suspension,
111 g of an α,ω-divinylated oil having a viscosity of 100 Pa.s which has a titer of 0.03 meq Vi per gram of oil,
35 g of ground quartz having a mean particle size (d50) close to 2.5 μm
12 g of a polyhydrogeno oil having a viscosity of 0.3 Pa.s which has a titer of 1.6 meq SiH per gram of oil,
12 g of an α,ω-dihydrogeno oil which has a titer of 1.9 meq SiH per gram of oil,
5 g of γ-methacryloxypropyl trimethoxysilane,
5 g of γ-glycidoxypropyl trimethoxysilane,
0.7 g of ethynylcyclohexano.
Portion B contains:
480 g of the suspension 20 g of butyl orthotitanate 1.1 g of a Karstedt catalyst containing a dose of 10% platinum.

100 parts by weight of A and 10 parts by weight of B are then mixed.

The crosslinking is carried out on a laboratory conveyor by exposure at a defined speed under two electrode lamps of 200 W/cm.

Depending on the experimental conditions, one or two lamps are in operation. The lamps are traditional lamps with a spectrum of emission of mercury or of mercury doped for example with iron or with gallium or with lead or the like.

The coefficients of friction are measured after exposure with the aid of a 200 g block linked to a dynamometer which can exact a force of 10N in order to move the block. To carry out the measurement, the tip of the fabric is installed on the block on the surface coated with silicone varnish on the glass side. A blank is carried out with a fabric coated with varnish-free crosslinked RTV. All the results obtained for examples 1 to 14 are assembled in the following table.

| Photocrosslinkable compositions for the varnishing of air bags | | | | | | | | | | | | | | | |
|---|---|---|---|---|---|---|---|---|---|---|---|---|---|---|---|
|  | C | 1 | 2 | 3 | 4 | 5 | 6 | 7 | 8 | 9 | 10 | 11 | 12 | 13 | 14 |
| $A_1$ parts | 0 | 100 | 90 | 0 | 0 | 0 | 0 | 0 | 0 | 0 | 50 | 70 | 0 | 20 | 20 |
| $A_2$ parts | 0 | 0 | 0 | 0 | 0 | 0 | 0 | 0 | 0 | 0 | 0 | 0 | 50 | 0 | 0 |
| $D_1$ parts | 0 | 0 | 0 | 100 | 90 | 0 | 0 | 0 | 45 | 45 | 50 | 30 | 50 | 72 | 72 |
| $D_2$ parts | 0 | 0 | 0 | 0 | 0 | 100 | 100 | 90 | 45 | 45 | 0 | 0 | 0 | 0 | 0 |
| $C_2$ parts | 0 | 2.5 | 2.5 | 2.5 | 2.5 | 2.5 | 2.5 | 2.5 | 2.5 | 2.5 | 2.5 | 2.5 | 2.5 | 2.5 | 2.5 |
| $G_2$ parts | 0 | 0 | 10 | 0 | 10 | 0 | 0 | 10 | 10 | 10 | 0 | 0 | 0 | 8 | 8 |
| Red22 parts | 0 | 0 | 0 | 0 | 0 | 0 | 0 | 0 | 0 | 0 | 0 | 0 | 0 | 0 | 0.4 |
| Hg lamp 200 W/cm | 0 | 1 | 1 | 1 | 1 | 1 | 1 | 1 | 0 | 0 | 1 | 1 | 1 | 2 | 1 |
| Hg/Ga lamp 200 w/cm | 0 | 1 | 1 | 1 | 1 | 0 | 0 | 0 | 0 | 0 | 1 | 1 | 1 | 0 | 0 |
| Hg/Ga lamp 80 w/cm | 0 | 0 | 0 | 0 | 0 | 0 | 0 | 0 | 1 | 1 | 0 | 0 | 0 | 0 | 0 |
| Speed m/min | 0 | 15 | 15 | 15 | 15 | 5 | 5 | 5 | 5 | 5 | 5 | 15 | 15 | 10 | 5 |
| Deposit g/m² | 0 | 4 | 9 | 5 | 7.8 | 1 | 6.9 | 8 | 4.5 | 1.8 | 9 | 6.4 | 5.6 | 6.4 | 5 |
| Coef. fric. Ks | 3.2 | 4 | 4 | 2 | 0.6 | 2.6 | 1.5 | 0.3 | 0.3 | 0.5 | 1.1 |  | 4.5 | 0.5 | 0.8 |

The best performances are obtained with the $B_2/$ type polymers in the presence of a silica-based filler. The results vary according to the irradiation conditions; in particular, the values obtained at low power, examples 8 and 9, are of great interest. The A/ type polymer may be added without affecting the results of Ks too much.

Example 15

Trials for the continuous application of the formula described in example 13 are carried out on a machine representative of an industrial equipment (pilot ROTOMEC) at 25 m/min on a width of fabric coated with RTV of 30 cm.

The irradiation conditions are obtained with a lamp from the company Fusion with an "H+" type bulb having a power of 80 W/cm.

3 deposits are made.

The coefficients of friction are then measured on glass.

The following are obtained:

3.5 g/m² of varnish corresponds to a Ks=1.4

6.0 g/m² of varnish corresponds to a Ks=0.8

9.0 g/m² of varnish corresponds to a Ks=0.5

The expected performances are indeed found for this formulation at a comparable deposit.

Example 16

Preparation of $B_2$

The synthesis is carried out in two steps from an α-ω-trimethylsilyl polymethylhydrogenodimethylsiloxane oil. The synthesis is carried out according to the reaction scheme described below.

Reaction Scheme

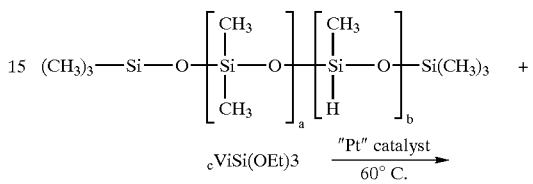

-continued

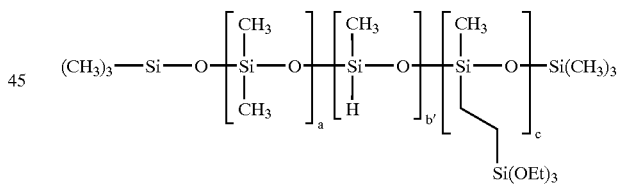

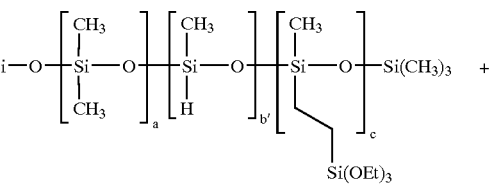

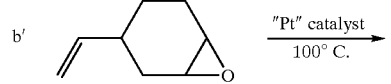

-continued

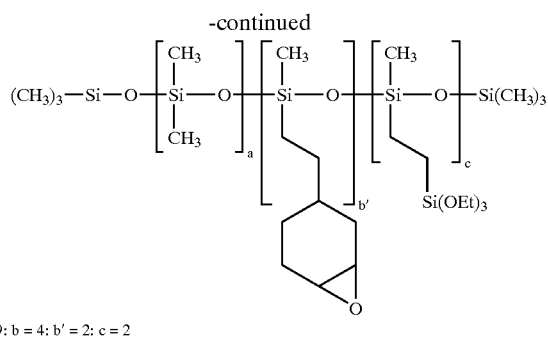

a = 9; b = 4; b' = 2; c = 2

50 g of toluene and 28.8 mg of a complex of platinum having the oxidation level zero complexed with divinyltetramethyldisiloxane at 11.5% platinum, that is 3.31 mg of platinum are loaded into a three-necked reactor provided with a central stirring paddle and with a capacity of 1 liter. 200 g of the siloxane polymer hydrogenated at 0.374%, that is 0.748 mol H, mixed with 70.97 g of vinyltriethoxysilane (that is 0.372 mol) at 25° C. are then poured in over 120 minutes and then the reaction mass is heated at 60° C. for two hours. The rate of conversion of the SiH units is 50%, that is 0.372 mol.

The freshly distilled vinylcyclohexene oxide is then added at the rate of 57 g (0.459 mol) and the reaction temperature is brought to 80° C. for three hours and 40 mg of the platinum complex are added during the last hour.

The medium is allowed to return to room temperature. The rate of conversion of the SiH units is 98.3%. The medium is heated to 100° C. and 40 mg of additional platinum complex are added and then the medium is left at 100° C. for three hours. The rate of conversion of the SiH units is 99.8%. The reaction mass is drawn off into a 500 ml round-bottomed flask (360.2 g) and 0.3 g of 2,2-thiodiethanol is added and then a vacuum is created and the toluene is carried away by flushing with argon at 97° C. into the reaction mass and 30 to 40° C. at the top of the column. After stopping the vacuum and cooling to 40° C., 1.47 g of polyvinylpyridine (Reillex) and 1.53 g of hydrogen peroxide (Prolabo) are added.

The medium is heated at 80° C. for two hours and 4.72 g of magnesium sulfate are added to the reaction mass. Filtration is then carried out on a carton of the oil obtained decolorized and the total mass yield of the synthesis is 86%, that is 272 g.

The viscosity of the oil is 55 mm²/s.

The number-average molecular mass is about 1300 determined by gel permeation chromatography.

The $^{29}$Si NMR makes it possible to identify and quantify the units.

The reference is tetramethylsilane.

| | | |
|---|---|---|
| $Me_3SiO_{1/2}$ | δ = 7 ppm | that is two units |
| $Me_2SiO_{2/2}$ and MeRSiO | δ = 22 ppm | that is 13 units |
| R'Si(OEt)$_3$ | δ = −45/−46 ppm | that is two units |

The $^1$H NMR completes the analysis of the product and confirms the expected structure of the polymer $D_2$.

Example 17

Example of formulation which makes it possible to produce the formulas described in example 1 to 14

Example 17.1

The formula described in example 1 is produced.

100 parts of $A_1$ Silcolease UV® POLY200 having a viscosity of 350 mPa.s are mixed, with vigorous mechanical stirring for a quarter of an hour at room temperature (IKA20 stirrer equipped with a triple-paddle rod) in a light-tight high-density polyethylene bottle, with 2.5 parts of $C_2$, that is a dilution in isopropanol at 18% of photoinitiator Rhodorsil® Photoinitiator 2074.

Example 17.2

The formula described in example 2 is produced.

90 parts of $A_1$ Silcolease UV® POLY200 $A_1$ having a viscosity of 350 mPa.s are mixed, with vigorous mechanical stirring for half an hour at room temperature (IKA20 stirrer equipped with a triple paddle rod) in a light-tight high-density polyethylene bottle, with 10 parts of silica $G_2$. When the mixture is well homogeneous and the silica is incorporated, 2.5 parts of $C_2$ are then added, that is a dilution in isopropanol at 18% of photoinitiator Rhodorsil® Photoinitiator 2074 and the medium is vigorously stirred for an additional fifteen minutes.

Example 17.3

The formula described in example 3 is produced.

100 parts of triethoxysilyl silane with epoxycyclohexyl functionality $B_1$ having a viscosity of 10 mPa.s are mixed, with vigorous mechanical stirring for a quarter of an hour at room temperature (IKA20 stirrer equipped with a triple-paddle rod) in a light-tight high-density polyethylene bottle, with 2.5 parts of $C_2$, that is a dilution in isopropanol at 18% of photoinitiator Rhodorsil® Photoinitiator 2074.

Example 17.4

The formula described in example 4 is produced.

90 parts of Silane $B_1$ having a viscosity of 10 mPa.s are mixed, with vigorous mechanical stirring for a half an hour at room temperature (IKA20 stirrer equipped with a triple paddle rod) in a light-tight high-density polyethylene bottle, with 10 parts of silica $G_2$. When the mixture is very homogeneous and the silica is incorporated, 2.5 parts of $C_2$ are then added, that is a dilution in isopropanol at 18% of photoinitiator Rhodorsil® Photoinitiator 2074 and the medium is vigorously stirred for an additional fifteen minutes.

Example 17.5 and 17.6

The formula described in examples 5 and 6 is produced.

100 parts of polymer $B_2$ having a viscosity of 55 mPa.s whose synthesis has just been described exp: 17 are mixed, with vigorous mechanical stirring for a quarter of an hour at room temperature (IKA20 stirrer equipped with a triple paddle rod) in a light-tight high-density polyethylene bottle, with 2.5 parts of $C_2$ that is a dilution in isopropanol at 18% of photoinitiator Rhodorsil® Photoinitiator 2074.

Example 17.7

The formula described in example 7 is produced.

90 parts of polymer $B_2$ having a viscosity of 55 mPa.s whose synthesis has just been described exp.17 are mixed, with vigorous mechanical stirring for a half an hour at room temperature (IKA20 stirrer equipped with a triple paddle rod) in a light-tight high-density polyethylene bottle, with 10 parts of silica $G_2$. When the mixture is very homogeneous and the silica is incorporated, 2.5 parts of $C_2$ are then added, that is a dilution in isopropanol at 18% of photoinitiator Rhodorsil® Photoinitiator 2074 and the mixture is vigorously stirred for an additional fifteen minutes.

Example 17.8 and 17.9

The formula described in examples 8 and 9 is produced.

45 parts of silane $B_1$ and 45 parts of polymer $B_2$ having a viscosity of 55 mPa.s whose synthesis has just been described exp.17 are mixed, with vigorous mechanical stirring for a half an hour at room temperature (IKA20 stirrer equipped with a triple paddle rod) in a light-tight high-density polyethylene bottle, with 10 parts of silica $G_2$. When the mixture is very well homogeneous and the silica is incorporated, 2.5 parts of $C_2$ are then added, that is a dilution in isopropanol at 18% of photoinitiator Rhodorsil® Photoinitiator 2074 and the medium is vigorously stirred for an additional fifteen minutes.

Example 17.10

The formula described in example 10 is produced.

50 parts of silane $B_1$ and 50 parts of polymer $A_1$ having a viscosity of 350 mPa.s are mixed, with vigorous mechanical stirring, for a quarter of an hour at room temperature (IKA20 stirrer provided with a triple paddle rod) in a light-tight high-density polyethylene bottle.

2.5 parts of $C_2$ that is a dilution in isopropanol at 18% of photoinitiator Rhodorsil® Photoinitiator 2074 are added and the medium is vigorously stirred for an additional five minutes.

Example 17.11

The formula described in example 11 is produced.

30 parts of silane $B_1$ and 70 parts of polymer $A_1$ having a viscosity of 350 mPa.s are mixed, with vigorous mechanical stirring, for a quarter of an hour at room temperature (IKA20 stirrer provided with a triple paddle rod) in a light-tight high-density polyethylene bottle.

2.5 parts of $C_2$ that is a dilution in isopropanol at 18% of photoinitiator Rhodorsil® Photoinitiator 2074 are added and the medium is vigorously stirred for an additional five minutes.

Example 17.12

The formula described in example 12 is produced.

50 parts of silane $B_1$ and 50 parts of polymer $A_2$ having a viscosity of 5000 mPa.s are mixed, with vigorous mechanical stirring, for half an hour at room temperature (IKA20 stirrer provided with a triple paddle rod) in a light-tight high-density polyethylene bottle.

2.5 parts of $C_2$ that is a dilution in isopropanol at 18% of photoinitiator Rhodorsil® Photoinitiator 2074 are added and the medium is vigorously stirred for an additional five minutes.

Example 17.13

The formula described in example 13 is produced.

72 parts of silane $B_1$ and 20 parts of SILCOLEASE® UV POLY200 $A_1$ having a viscosity of 350 mPa.s whose synthesis has just been described exp.17 are mixed, with vigorous mechanical stirring for a half an hour at room temperature (IKA20 stirrer equipped with a triple paddle rod) in a light-tight high-density polyethylene bottle, with 10 parts of silica $G_2$. When the mixture is very homogeneous and the silica is incorporated, 2.5 parts of $C_2$ are then added, that is a dilution in isopropanol at 18% of photoinitiator Rhodorsil® Photoinitiator 2074 and the medium is vigorously stirred for an additional fifteen minutes.

Example 17.14

The formula described in example 14 is produced.

72 parts of silane $B_1$ and 20 parts of SILCOLEASE® UV POLY200 $A_1$ having a viscosity of 350 mPa.s whose synthesis has just been described exp.17 are mixed, with vigorous mechanical stirring for a half an hour at room temperature (IKA20 stirrer equipped with a triple paddle rod) in a light-tight high-density polyethylene bottle, with 10 parts of silica $G_2$. When the mixture is very homogeneous and the silica is incorporated, 0.4 parts of red pigment Red22 marketed by Sun chemical are then added and the medium is vigorously stirred until perfect dilution of the pigment is obtained which results in the production of a transparent light red formulation. 2.5 parts of $C_2$ are then added, that is a dilution in isopropanol at 18% of photoinitiator Rhodorsil® Photoinitiator 2074 and the medium is vigorously stirred for an additional fifteen minutes.

Example 18

Thermal transfer ribbons are used for example in the printing of labels. They are used in printers whose printing speed varies between 150 and 300 mm/s. It is very important for the printing head (flat or wedge-like) which strikes the other side of the surface containing the ink (waxes or resins) to be able to slide over this surface at high temperature of between 100 and 200° C.

A very thin protective coating of between 0.1 and 1 micrometer is generally used to protect the surface of the film and improve the impact of the printing head without deforming the transfer of the ink onto the applied support.

The plastic film used to transfer the ink is based on very thin polyester having a thickness of a few microns.

A good measurement of the quality of the protective coating is made by the sliding capacity of this coating.

The coefficient of friction is then measured after exposure with the aid of a 200 g block linked to a dynamometer which can exert a force of 10N in order to move the block.

To make the measurement, the polyester film coated with a protective coating layer based on photocrosslinked silicone preferably of less than 1 micrometer is installed. A blank is made with the polyester film containing no silicone.

The results obtained are assembled in the following table for compositions containing various portions of:
$A_1$/SILCOLEASE® UV POLY200
$A_2$/SILCOLEASE® UV POLY201

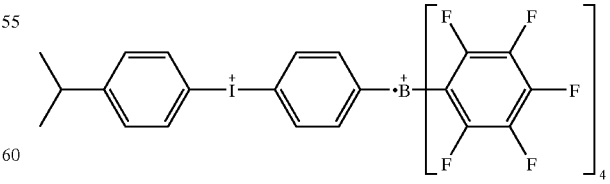

in isopropanolic solution at 18%.
$G_2$/Aerosil silica 300 m$^2$/g

The polyester films are coated with silicone on a 5-roll head, at a speed of 50 m/min (0.5 g/m$^2$) and then photocrosslinked with a 120 W/cm lamp.

The drag ratio or dynamic friction coefficient values obtained as described above are presented in the table below.

| Silicone formulations: | | | | | | |
|---|---|---|---|---|---|---|
| | Control | 1' | 2' | 3' | 4' | 5' |
| $A_1$ parts | 0 | 100 | 100 | 75 | 22 | 60 |
| $D_1$ parts | 0 | 0 | 0 | 25 | 75 | 35 |
| $C_2$ parts | 0 | 2.5 | 3 | 2.5 | 2.5 | 2.5 |
| $G_2$ parts | 0 | 0 | 0 | 0 | 3 | 5 |
| Coef. fric. Kd | 0.3 | 3 | 1 | 0.3 | 0.25 | 0.4 |

Example 19

It is also possible to seek to obtain plastic films mainly based on polyethylene or polypropylene intended for wrapping in order to protect market values. In this case, it is possible to seek to have a top-varnishing based on silicone in order to retain the anti-adhesion properties.

This type of coating is also required to retain a slipperiness at least equivalent to the starting plastic film imprinted or otherwise.

Trials were carried out for the application of silicone layers at less than 1 micrometer to 50 m/min to coronna-treated polyethylene film (electrical discharge which makes it possible to increase the surface tension of the film and to ensure good sticking of the photocrosslinkable silicone to this surface). The silicone is photocrosslinked in the presence of a 120 W/cm mercury lamp. Two supports were used. One virgin support, and one support printed with a blue cationic flexo® ink 3 µm thick.

In both cases, 0.5 g/m² of silicone of the formulation 5' is applied according to example 18 described above. In both cases, a perfectly crosslinked silicone layer is obtained whose coefficient of friction is in the region of 0.4.

It is possible to apply the silicone compositions premixed beforehand in the form of monocomponent compositions or to prepare the silicone photoinitiator mixture at the last moment.

What is claimed is:

1. A silicone composition useful for the production of varnish having anti-friction properties, this composition comprising at least one polyorganosiloxane (POS) which can be crosslinked by means of crosslinking functional groups (CFG) by the cationic and/or free-radical route and an effective quantity of a cationic initiator system comprising, as thermal initiator and/or photoinitiator, a product chosen from the onium salts of an element of groups 15 to 17 of the Periodic Table or the salts of an organometallic complex of an element of groups 4 to 10 of the Periodic Table, whose cationic entity is selected from:
1) the onium salts of formula (I):

$$[(R^1)_n\text{—}A\text{—}(R^2)_m]^+ \quad (I)$$

in which formula:
A represents an element of groups 15 to 17 of the Periodic Table;
$R^1$ represents a carbocyclic or heterocyclic $C_6$–$C_{20}$ aryl radical, it being possible for said heterocyclic radical to contain, as heteroelements, nitrogen or sulfur;
$R^2$ represents $R^1$ or a linear or branched $C_1$–$C_{30}$ alkyl or alkenyl radical, said radicals $R^1$ and $R^2$ being optionally substituted with a $C_1$–$C_{25}$ alkoxy, $C_1$–$C_{25}$ alkyl, nitro, chloro, bromo, cyano, carboxyl, ester or mercapto group;
n is an integer ranging from 1 to v+1, v being the valency of the element A,
m is an integer ranging from 0 to v−1 with n+m=v+1;
2) the oxoisothiochromanium salts;
3) the sulfonium salts in which the cationic entity comprises:
3-1) at least one polysulfonium species of formula (III-1):

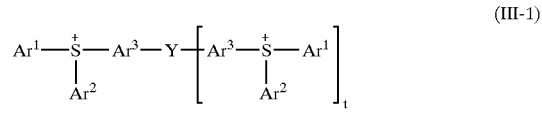
(III-1)

in which:
the symbols $Ar^1$, which may be mutually identical or different, each represent a monovalent phenyl or naphthyl radical optionally substituted with one or more radicals chosen from: a linear or branched $C_1$–$C_{12}$, alkyl radical, a linear or branched $C_1$–$C_{12}$, alkoxy radical, a halogen atom, an —OH group, a —COOH group, an ester group —COO-alkyl where the alkyl portion is a linear or branched $C_1$–$C_{12}$ residue, and a group of formula —$Y^4$—$Ar^2$ where the symbols $Y^4$ and $Ar^2$ have the meanings given just below;
the symbols $Ar^2$, which may be mutually identical or different, or identical to $Ar^1$, each represent a monovalent phenyl or naphthyl radical optionally substituted with one or more radicals chosen from: a linear or branched $C_1$–$C_{12}$, alkyl radical, a linear or branched $C_1$–$C_{12}$, alkoxy radical, a halogen atom, an —OH group, a —COOH group, an ester group —COO-alkyl where the alkyl portion is a linear or branched $C_1$–$C_{12}$ residue,
the symbols $Ar^3$, which may be mutually identical or different, each represent a divalent phenylene or naphthylene radical optionally substituted with one or more radicals chosen from: a linear or branched $C_1$–$C_{12}$, alkyl radical, a linear or branched $C_1$–$C_{12}$, alkoxy radical, a halogen atom, an —OH group, a —COOH group, an ester group —COO-alkyl where the alkyl portion is a linear or branched $C_1$–$C_{12}$ residue,
t is an integer equal to 0 or 1,
with the additional conditions according to which:
a) when t=0, the symbol Y is then a monovalent radical $Y^1$ representing the group of formula:

$Y^1$:

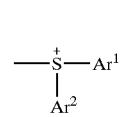

where the symbols $Ar^1$ and $Ar^2$ have the meanings given above,
b) when t=1:
b1) on the one hand, the symbol Y is then a divalent radical having the following meanings $Y^2$ to $Y^4$:

$Y^2$: a group of formula:

where the symbol $Ar^2$ has the meanings given above,
$Y^3$: a single valency bond,
$Y^4$: a divalent residue chosen from:

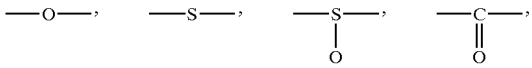

a linear or branched $C_1$–$C_{12}$ alkylene residue, and a residue of formula —Si(CH$_3$)$_2$O—, b2) on the other hand, only in the case where the symbol Y represents $Y^3$ or $Y^4$, the radicals $Ar^1$ and $Ar^2$ (terminal) possess, in addition to the meanings given above, the possibility of being linked to each other by the residue Y' consisting of $Y'^1$ a single valency bond or of $Y'^2$ a divalent residue chosen from the residues cited in the definition of $Y^4$, which is seated between the carbon atoms, facing one another, situated on each aromatic ring at the ortho position with respect to the carbon atom directly linked to the cation $S^+$;

3-2) and/or at least one mono-sulfonium species possessing a single cationic center $S^+$ per mol of cation and consisting of species of formula (III-2):

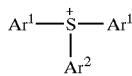

(III-2)

in which $Ar^1$ and $Ar^2$ have the meanings given above in formula (III-1), including the possibility of directly linking to one another only one of the radicals $Ar^1$ to $Ar^2$ in the manner indicated above in the definition of the additional condition which applies when t=1 in formula (III-1), involving the residue Y';

4) the organometallic salts of formula (IV):

$(L^1L^2L^3M)^{+q}$ (IV)

in which formula:
M represents a metal of group 4 to 10 of the Periodic Table;
$L^1$ represents a ligand linked to the metal M by π electrons, a ligand chosen from the ligands $\eta^3$-alkyl, $\eta^5$-cyclopendadienyl and $\eta^7$-cycloheptatrienyl and the $\eta^6$-aromatic compounds chosen from the optionally substituted $\eta^6$-benzene ligands and the compounds having from 2 to 4 fused rings, each ring being capable of contributing to the valency layer of the metal M by 3 to 8 π electrons;
$L^2$ represents a ligand linked to the metal M by π electrons, a ligand chosen from the ligands $\eta^7$-cycloheptatrienyl and the $\eta^6$-aromatic compounds chosen from the optionally substituted $\eta^6$-benzene ligands and the compounds having from 2 to 4 fused rings, each ring being capable of contributing to the valency layer of the metal M by 6 or 7 π electrons;
$L^3$ represents from 0 to 3 identical or different ligands linked to the metal M by π electrons, ligand(s) chosen from CO and $NO_2^+$; the total electron charge q of the complex to which $L^1$, $L^2$ and $L^3$ contribute and the ionic charge of the metal M being positive and equal to 1 or 2;
the anionic entity having the formula:

in which formula:
a and b are integers ranging, for a, from 0 to 6 and, for b, from 0 to 6 with a+b≧2;
the symbols $X^1$ represent elements chosen from groups 3A, 4A, 5A of the Periodic Table;
the symbols $X^2$ represent:
a halogen atom (chlorine, fluorine) with a=0 to 3,
an OH functional group with a=0 to 2;
the symbols R are identical or different and represent: a phenyl radical substituted with at least one electron-attracting group, and/or with at least 2 halogen atoms, and this being when the cationic entity is an onium of an element of groups 15 to 17 of the Periodic Table,
a phenyl radical substituted with at least one electron attracting atom or one electron-attracting group, and this being when the cationic entity is an organometallic complex of an element of groups 4 to 10 of the Periodic Table,
an aryl radical containing at least two aromatic nuclei optionally substituted with at least one electron attracting atom or one electron-attracting group, regardless of the cationic entity;
said composition comprising, in addition, molecules substituted with hydrolyzable secondary functional groups (SFG) carried by at least one silicon atom per molecule; with the proviso that either said CFGs and said SFGs are carried by different molecules based on silicon, or said composition comprises POS molecules that are substituted both with with CFGs and with SFGs and POS molecules substituted only with CFGs.

2. The composition of claim 1, wherein said SFGs are selected from the group consisting of alkoxy and/or enoxy and/or carboxyl units.

3. The composition of claim 1, wherein it comprises:
A—at least one POS carrying CFG, the latter being chosen from the groups comprising at least one ethylenically unsaturated functional group;
B—at least one silane and/or one POS carrying SFGs, the latter representing at least 1% by weight of B;
C—at least one photoinitiator system.

4. The composition of claim 1, wherein it comprises:
A—at least one POS carrying CFG, the latter being chosen from the groups comprising at least one ethylenically unsaturated functional group;
C—at least one photoinitiator system;
D—at least one POS carrying CFGs and SFGS, the CFGs being chosen from groups comprising at least one ethylenically unsaturated functional group.

5. The composition of claim 1, wherein it comprises in addition:
E—optionally at least one organic reactive diluent chosen from organic resins of the epoxide and/or vinyl ether and/or oxethane type;
F—optionally at least one organic or inorganic pigment;
G—optionally a filler;
H—optionally at least one photosensitizer.

6. The composition of claim 3, wherein the POSs A are epoxysilicones and/or vinyl ether silicones which are:
1) either linear and consist of units of formula (II-1), ending with units of formula (II-2),
2) or cyclic and consisting of units of formula (II-1):

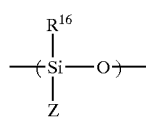
(II-1)

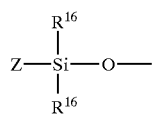
(II-2)

in which formulae:
the symbols $R^{16}$ are similar or different and represent:
either a linear or branched $C_1$–$C_6$ alkyl radical optionally substituted with one or more halogens,
or an optionally substituted $C_5$–$C_8$ cycloalkyl radical,
or an aryl or aralkyl radical optionally substituted with halogens and/or alkoxyls,
the symbols Z are similar or different and represent:
either the radical $R^{16}$,
or a CFG group corresponding to an epoxide or vinyl ether residue linked to the silicon by means of a divalent radical containing from 2 to 20 carbon atoms optionally comprising a heteroatom, at least one of the symbols Z corresponding to a CFG group.

7. The composition of claim 3, wherein the POSs A are epoxysilicones and/or vinyl ether silicones which are:
1) either linear and consist of units of formula (II-1), ending with units of formula(II-2),
2) or cyclic and consisting of units of formula (II-1):

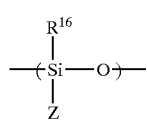
(II-1)

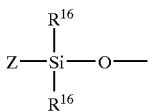
(II-2)

in which formulae:
the symbols $R^{16}$ are similar or different and represent:
either a linear or branched $C_1$–$C_6$ alkyl radical substituted with one or more halogens, the substituted alkyl radicals being: methyl, ethyl, propyl, octyl and 3,3,3-trifluoropropyl,
or an optionally substituted $C_5$–$C_8$ cycloalkyl radical,
or an aryl or aralkyl radical optionally substituted with halogens and/or alkoxyls,
and at least 60 mol % of the $R^{16}$ radicals being methyls,
the symbols Z are similar or different and represent:
either the radical $R^{16}$,
or a CFG group corresponding to an epoxide or vinyl ether residue linked to the silicon by means of a divalent radical containing from 2 to 20 carbon atoms optionally comprising a heteroatom, at least one of the symbols Z corresponding to a CFG group.

8. The composition of claim 3, wherein the POSs A are epoxysilicones of the following formulae (A-I) (A-II):

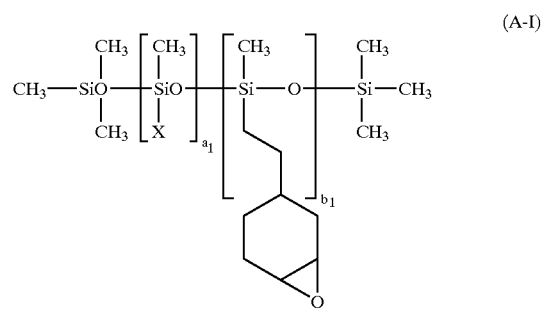
(A-I)

with X=$CH_3$; phenyl; cycloalkyl; $C_1$–$C_{18}$ alkyl; alkenyl; —OH; H; $CH_2$—$CH_2$—$CH_2$—OH; $CH_2$—$CH_2$—$CF_3$; or —$(CH_2)_n$—$CF_3$, n=1 to 20;

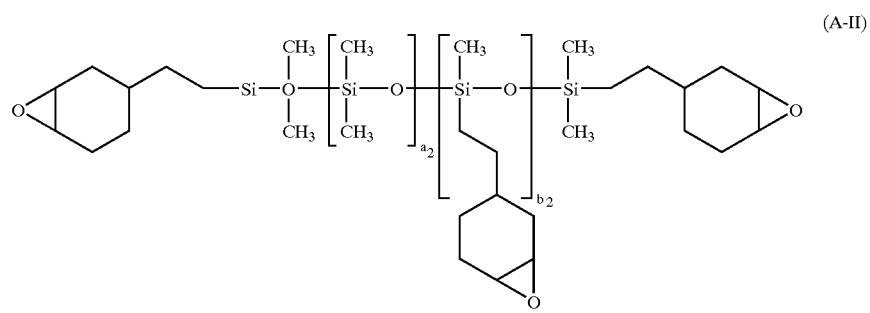
(A-II)

$a_1$, $a_2$ and $b_1$, $b_2$ being defined as below in formulae (A-I) and (A-II)

$$1 \leq a_1, a_2 \ 1 \leq b_1, b_2;$$

$a_2$, $b_2$ being=0 in formula (A-II) to give the epoxidized disiloxane (A-III).

9. The composition of claim 3, wherein the compound(s) B is (are) chosen from that (or those) of the following formula B:

$$R^{22}_x[SFG]_y SiO_{4-(x+y)/2} \quad (B)$$

in which:
  x=0, 1, 2 or 3
  y=1, 2, 3 or 4
  x+y≦4
  the radicals $R^{22}$ are mutually identical or different and correspond to a linear or branched alkyl, a cycloalkyl, a hydroxyl, a hydrogen, a vinyl, a —$CF_3$, or a —$(CH_2)_m$—$CF_3$ with m=1 to 50,
  the SFGs are mutually identical or different and correspond to an alkoxy; an enoxy; or a carboxyl.

10. The composition of claim 3, wherein the compound(s) B is (are) chosen from that (or those) of the following formula B:

$$R^{22}_x[SFG]_y SiO_{4-(x+y)/2} \quad (B)$$

in which:
  x=0, 1, 2 or 3
  y=1, 2, 3 or 4
  x+y≦4
  the radicals $R^{22}$ are mutually identical or different and correspond to a linear or branched alkyl, a cycloalkyl, a hydroxyl, a hydrogen, a vinyl, a —$CF_3$, or a —$(CH_2)_m$—$CF_3$ with m=1 to 50,
  the SFGs are mutually identical or different and correspond to:
    —$OR^3$ with $R^3$ representing a linear or branched $C_1$–$C_{30}$ alkyl or a cycloalkyl;
    —$(OR^4)_p$—$OR^5$;
    —$(R^6)_q$—$Si(OR^7)_r(R^8)_t$
    with $R^4$, $R^7$, $R^8$ mutually identical or different and having the same definition as that given above for $R^3$ and with $R^6$ mutually identical or different and corresponding to an alkylene; p, q=1 to 50; r=1, 2 or 3 and t=0, 1 or 2; r+t=3;
    —O—CH=CH—$R^8$;
    —$(R^9)_u$—$Si(OCH=CHR^{10})_v(R^{11})_w$
    with $R^8$, $R^{10}$, $R^{11}$ mutually identical or different and having the same definition as that given above for $R^3$, and with $R^9$ having the same definition as that given above for $R^6$; u=1 to 50, v=1, 2 or 3 and w=0, 1 or 2; v+w=3;
    —$OCOR^{12}$;
    $(R^{13})_z$—$Si(OCOR^{14})_{z1}(R^{15})_{z2}$;
    with $R^{12}$, $R^{14}$ as defined above for $R^8$, $R^{10}$, $R^{11}$; $R^{13}$ as defined above for $R^9$; and z=1 to 50, $z_1$=1, 2 or 3 and $z_2$=0, 1 or 2; $z_1+z_2$=3.

11. The composition of claim 4, wherein the POS D comprises
  SFGs corresponding to an alkoxy; an enoxy; or a carboxyl;
  and CFGs of the (meth)acrylate and/or vinyl ether and/or epoxide and/or oxethane type.

12. The composition of claim 4, wherein the POS D comprises SFGs of the alkoxy type and CFGs of the epoxide type.

13. The composition of claim 4, wherein the POS D corresponds to the POSs of the following formulae (D', D", D'"):

(D')

(CH_3)_3Si—O—[Si(CH_3)(CH_3)—O]_{d1}—[Si—O]_{d2}—[Si—O]_{d3}—Si(CH_3)_3 with side chains cyclohexyl-epoxide and Si(OEt)_3 with $0 \leq d1$, $1 \leq d2$, $1 \leq d3$ (D")

epoxycyclohexyl-CH_2CH_2—Si(OMe)_2—O—[Si(CH_3)(OMe)—O]_e—Si(OMe)_2—CH_2CH_2-epoxycyclohexyl (D'")

epoxycyclohexyl-CH_2CH_2—Si(OEt)_2—O—[Si(CH_3)(OEt)—O]_e—Si(OEt)_2—CH_2CH_2-epoxycyclohexyl with Me=methyl; Et=ethyl and 0≦e.

14. The silicone composition of claim 1, wherein:
  said cationic entity is selected from:
  1) the onium salts of formula (I):

$$[(R^1)_n—A—(R^2)_m]^+ \quad (I)$$

in which formula:
  A represents an element of groups 15 to 17 of the Periodic Table, selected from the group consisting of I, S, Se, P or N; and $R^1$, $R^2$, n and m have the same meaning as above;
  2) the oxoisothiochromanium salts selected from the group consisting of the sulfonium salt of 2-ethyl-4-oxoisothiochromanium or of 2-dodecyl-4-oxoisothiochromanium;
  3) said sulfonium salts;
  4) the organometallic salts of formula (IV):

$$(L^1L^2L^3M)^{+q} \quad (IV)$$

in which formula:
  M represents a metal of group 4 to 10 of the Periodic Table, selected from the group consisting of iron, manganese, chromium, cobalt; $L^1$, $L^2$ and $L^3$ have the same meaning as above;
  the anionic entity having the formula: $[X^1X^2_aR_b]^-$ in which formula:
  a, b and $X^1$ have the same meaning as above;
  the symbols $X^2$ represent:
    a chlorine atom or a fluorine atom, with a=0 to 3,
    an OH functional group with a=0 to 2;
  the symbols R are identical or different and represent:a phenyl radical substituted with at least one electron-attracting group selected from the group consisting of OCF$_3$, CF$_3$, NO$_2$, CN, and/or with at least 2 fluorine atoms, and this being when the cationic entity is an onium of an element of groups 15 to 17 of the Periodic Table, a phenyl radical substituted with at least one electron attracting atom or one electron-attracting group, selected from the group consisting of a fluorine atom, CF$_3$, OCF$_3$, NO$_2$, CN, and this being when the cationic entity is an organo-metallic complex of an element of groups 4 to 10 of the Periodic Table, an aryl radical containing at least two aromatic nuclei selected from the group consisting of biphenyl, naphthyl, optionally substituted with at least one electron attracting atom or one electron attracting group, selected from the group consisting of a fluorine atom, OCF$_3$, CF$_3$, NO$_2$, CN, regardless of the cationic entity.

15. A method of applying an antifriction varnish layer to a support, comprising coating a support with a silicone composition, and exposing the surface thus coated to actinic radiation and/or to a beam of electrons and/or to heat, so as to cause the crosslinking of the silicone composition and obtain an antifriction varnish layer, wherein said silicone composition comprises at least one polyorganosiloxane (POS) which can be crosslinked by means of crosslinking functional groups (CFG) by the cationic and/or free-radical route and an effective quantity of a cationic initiator system comprising, as thermal initiator and/or photoinitiator, a product chosen from the onium salts of an element of groups 15 to 17 of the Periodic Table or the salts of an organometallic complex of an element of groups 4 to 10 of the Periodic Table, whose cationic entity is selected from:

1) the onium salts of formula (I):

in which formula:

A represents an element of groups 15 to 17 of the Periodic Table;

R$^1$ represents a carbocyclic or heterocyclic C$_6$–C$_{20}$ aryl radical, it being possible for said heterocyclic radical to contain, as heteroelements, nitrogen or sulfur;

R$^2$ represents R$^1$ or a linear or branched C$_1$–C$_{30}$ alkyl or alkenyl radical, said radicals R$^1$ and R$^2$ being optionally substituted with a C$_1$–C$_{25}$ alkoxy, C$_1$–C$_{25}$ alkyl, nitro, chloro, bromo, cyano, carboxyl, ester or mercapto group;

n is an integer ranging from 1 to v+1, v being the valency of the element A, m is an integer ranging from 0 to v−1 with n+m=v+1;

2) the oxoisothiochromanium salts;

3) the sulfonium salts in which the cationic entity comprises:

3-1) at least one polysulfonium species of formula (III-1):

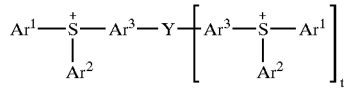

in which:

the symbols Ar$^1$, which may be mutually identical or different, each represent a monovalent phenyl or naphthyl radical optionally substituted with one or more radicals chosen from: a linear or branched C$_1$–C$_{12}$, alkyl radical, a linear or branched C$_1$–C$_{12}$, alkoxy radical, a halogen atom, an —OH group, a —COOH group, an ester group —COO-alkyl where the alkyl portion is a linear or branched C$_1$–C$_{12}$ residue, and a group of formula —Y$^4$—Ar$^2$ where the symbols Y$^4$ and Ar$^2$ have the meanings given just below;

the symbols Ar$^2$, which may be mutually identical or different, or identical to Ar$^1$, each represent a monovalent phenyl or naphthyl radical optionally substituted with one or more radicals chosen from: a linear or branched C$_1$–C$_{12}$, alkyl radical, a linear or branched C$_1$–C$_{12}$, alkoxy radical, a halogen atom, an —OH group, a —COOH group, an ester group —COO-alkyl where the alkyl portion is a linear or branched C$_1$–C$_{12}$ residue, the symbols Ar$^3$, which may be mutually identical or different, each represent a divalent phenylene or naphthylene radical optionally substituted with one or more radicals chosen from: a linear or branched C$_1$–C$_{12}$, alkyl radical, a linear or branched C$_1$–C$_{12}$, alkoxy radical, a halogen atom, an —OH group, a —COOH group, an ester group —COO-alkyl where the alkyl portion is a linear or branched C$_1$–C$_{12}$ residue, t is an integer equal to 0 or 1, with the additional conditions according to which:

a) when t=0, the symbol Y is then a monovalent radical Y$^1$ representing the group of formula:

Y$^1$:

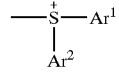

where the symbols Ar$^1$ and Ar$^2$ have the meanings given above, b) when t=1:

b1) on the one hand, the symbol Y is then a divalent radical having the following meanings Y$^2$ to Y$^4$:

Y$^2$: a group of formula:

where the symbol Ar$^2$ has the meanings given above,

Y$^3$: a single valency bond,

Y$^4$: a divalent residue chosen from:

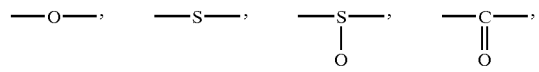

a linear or branched C$_1$–C$_{12}$ alkylene residue, and a residue of formula —Si(CH$_3$)$_2$O—, b2) on the other hand, only in the case where the symbol Y represents Y$^3$ or Y$^4$, the radicals Ar$^1$ and Ar² (terminal) possess, in addition to the meanings given above, the possibility of being linked to each other by the residue Y' consisting of Y'¹ a single valency bond or of Y'² a divalent residue chosen from the residues cited in the definition of Y⁴, which is seated between the carbon atoms, facing one another, situated on each aromatic ring at the ortho position with respect to the carbon atom directly linked to the cation S⁺;

3-2) and/or at least one mono-sulfonium species, possessing a single cationic center S⁺ per mol of cation and consisting of species of formula (III-2):

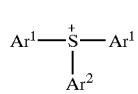
(III-2)

in which Ar¹ and Ar² have the meanings given above in formula (III-1), including the possibility of directly linking to one another only one of the radicals Ar¹ to Ar² in the manner indicated above in the definition of the additional condition which applies when t=1 in formula (III-1), involving the residue Y';

4) the organometallic salts of formula (IV):

$(L^1L^2L^3M)^{+q}$ (IV)

in which formula:

M represents a metal of group 4 to 10 of the Periodic Table;

L¹ represents a ligand linked to the metal M by π electrons, a ligand chosen from the ligands η³-alkyl, η⁵-cyclopendadienyl and η⁷-cycloheptatrienyl and the η⁶-aromatic compounds chosen from the optionally substituted η⁶-benzene ligands and the compounds having from 2 to 4 fused rings, each ring being capable of contributing to the valency layer of the metal M by 3 to 8 π electrons;

L² represents a ligand linked to the metal M by π electrons, a ligand chosen from the ligands η⁷-cycloheptatrienyl and the η⁶-aromatic compounds chosen from the optionally substituted η⁶-benzene ligands and the compounds having from 2 to 4 fused rings, each ring being capable of contributing to the valency layer of the metal M by 6 or 7 π electrons;

L³ represents from 0 to 3 identical or different ligands linked to the metal M by π electrons, ligand(s) chosen from CO and NO₂⁺; the total electron charge q of the complex to which L¹, L² and L³ contribute and the ionic charge of the metal M being positive and equal to 1 or 2;

the anionic entity having the formula:

in which formula:

a and b are integers ranging, for a, from 0 to 6 and, for b, from 0 to 6 with a+b≧2;

the symbols X¹ represent elements chosen from groups 3A, 4A, 5A of the Periodic Table;

the symbols X² represent:

a halogen atom (chlorine, fluorine) with a=0 to 3, an OH functional group with a=0 to 2;

the symbols R are identical or different and represent: a phenyl radical substituted with at least one electron attracting group, and/or with at least 2 halogen atoms, and this being when the cationic entity is an onium of an element of groups 15 to 17 of the Periodic Table, a phenyl radical substituted with at least one electron attracting atom or one electron attracting group, and this being when the cationic entity is an organometallic complex of an element of groups 4 to 10 of the Periodic Table, an aryl radical containing at least two aromatic nuclei optionally substituted with at least one electron attracting atom or one electron-attracting group, regardless of the cationic entity;

said composition comprising, in addition, molecules substituted with hydrolyzable secondary functional groups (SFG) carried by at least one silicon atom per molecule; with the proviso that either said CFGs and said SFGs are carried by different molecules based on silicon, or said composition comprises POS molecules that are substituted both with CFGs and with SFGs and POS molecules substituted only with CFGs.

16. A varnish support having antifriction properties, said support comprising a substrate coated on at least one of its surfaces with at least one layer of silicone elastomer which can be crosslinked or which is at least partially crosslinked, said antifriction varnish obtained from a silicone composition comprising at least one polyorganosiloxane (POS) which can be crosslinked by means of crosslinking functional groups (CFG) by the cationic and/or free-radical route and an effective quantity of a cationic initiator system comprising, as thermal initiator and/or photoinitiator, a product chosen from the onium salts of an element of groups 15 to 17 of the Periodic Table or the salts of an organometallic complex of an element of groups 4 to 10 of the Periodic Table, whose cationic entity is selected from:

1) the onium salts of formula (I):

(I)

in which formula:

A represents an element of groups 15 to 17 of the Periodic Table;

R¹ represents a carbocyclic or heterocyclic C₆–C₂₀ aryl radical, it being possible for said heterocyclic radical to contain, as heteroelements, nitrogen or sulfur;

R² represents R¹ or a linear or branched C₁–C₃₀ alkyl or alkenyl radical, said radicals R¹ and R² being optionally substituted with a C₁–C₂₅ alkoxy, C₁–C₂₅ alkyl, nitro, chloro, bromo, cyano, carboxyl, ester or mercapto group;

n is an integer ranging from 1 to v+1, v being the valency of the element A, m is an integer ranging from 0 to v−1 with n+m=v+1;

2) the oxoisothiochromanium salts;

3) the sulfonium salts in which the cationic entity comprises:

3-1) at least one polysulfonium species of formula (III-1):

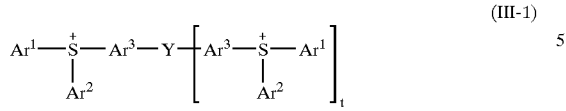 (III-1)

in which:
the symbols $Ar^1$, which may be mutually identical or different, each represent a monovalent phenyl or naphthyl radical optionally substituted with one or more radicals chosen from: a linear or branched $C_1-C_{12}$, alkyl radical, a linear or branched $C_1-C_{12}$, alkoxy radical, a halogen atom, an —OH group, a —COOH group, an ester group —COO-alkyl where the alkyl portion is a linear or branched $C_1-C_{12}$ residue, and a group of formula —$Y^4$—$Ar^2$ where the symbols $Y^4$ and $Ar^2$ have the meanings given just below;

the symbols $Ar^2$, which may be mutually identical or different, or identical to $Ar^1$, each represent a monovalent phenyl or naphthyl radical optionally substituted with one or more radicals chosen from: a linear or branched $C_1-C_{12}$, alkyl radical, a linear or branched $C_1-C_{12}$, alkoxy radical, a halogen atom, an —OH group, a —COOH group, an ester group —COO-alkyl where the alkyl portion is a linear or branched $C_1-C_{12}$ residue, the symbols $Ar^3$, which may be mutually identical or different, each represent a divalent phenylene or naphthylene radical optionally substituted with one or more radicals chosen from: a linear or branched $C_1-C_{12}$, alkyl radical, a linear or branched $C_1-C_{12}$, alkoxy radical, a halogen atom, an —OH group, a —COOH group, an ester group —COO-alkyl where the alkyl portion is a linear or branched $C_1-C_{12}$ residue, t is an integer equal to 0 or 1,
with the additional conditions according to which:
a) when t=0, the symbol Y is then a monovalent radical $Y^1$ representing the group of formula:

$Y^1$:

where the symbols $Ar^1$ and $Ar^2$ have the meanings given above,
b) when t=1:
  b1) on the one hand, the symbol Y is then a divalent radical having the following meanings $Y^2$ to $Y^4$:
  $Y^2$: a group of formula:

where the symbol $Ar^2$ has the meanings given above,
$Y^3$: a single valency bond, $Y^4$: a divalent residue chosen from:

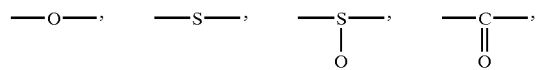

a linear or branched $C_1-C_{12}$ alkylene residue, and a residue of formula —Si(CH$_3$)$_2$O—,
b2) on the other hand, only in the case where the symbol Y represents $Y^3$ or $Y^4$, the radicals $Ar^1$ and $Ar^2$ (terminal) possess, in addition to the meanings given above, the possibility of being linked to each other by the residue Y' consisting of $Y'^1$ a single valency bond or of $Y'^2$ a divalent residue chosen from the residues cited in the definition of $Y^4$, which is seated between the carbon atoms, facing one another, situated on each aromatic ring at the ortho position with respect to the carbon atom directly linked to the cation $S^+$;

3-2) and/or at least one mono-sulfonium species possessing a single cationic center $S^+$ per mol of cation and consisting of species of formula (III-2):

 (III-2)

in which $Ar^1$ and $Ar^2$ have the meanings given above in formula (III-1), including the possibility of directly linking to one another only one of the radicals $Ar^1$ to $Ar^2$ in the manner indicated above in the definition of the additional condition which applies when t=1 in formula (III-1), involving the residue Y';

4) the organometallic salts of formula (IV):

$(L^1L^2L^3M)^{+q}$ (IV)

in which formula:
M represents a metal of group 4 to 10 of the Periodic Table;
$L^1$ represents a ligand linked to the metal M by π electrons, a ligand chosen from the ligands $\eta^3$-alkyl, $\eta^5$-cyclopendadienyl and $\eta^7$-cycloheptatrienyl and the $\eta^6$-aromatic compounds chosen from the optionally substituted $\eta^6$-benzene ligands and the compounds having from 2 to 4 fused rings, each ring being capable of contributing to the valency layer of the metal M by 3 to 8 π electrons;
$L^2$ represents a ligand linked to the metal M by π electrons, a ligand chosen from the ligands $\eta^7$-cycloheptatrienyl and the $\eta^6$-aromatic compounds chosen from the optionally substituted $\eta^6$-benzene ligands and the compounds having from 2 to 4 fused rings, each ring being capable of contributing to the valency layer of the metal M by 6 or 7 π electrons;
$L^3$ represents from 0 to 3 identical or different ligands linked to the metal M by π electrons, ligand(s) chosen from CO and NO$_2^+$; the total electron charge q of the complex to which $L^1$, $L^2$ and $L^3$ contribute and the ionic charge of the metal M being positive and equal to 1 or 2;
the anionic entity having the formula:

$[X^1X^2{}_aR_b]^-$ in which formula:
- a and b are integers ranging, for a, from 0 to 6 and, for b, from 0 to 6 with a+b≧2;
- the symbols $X^1$ represent elements chosen from groups 3A, 4A, 5A of the Periodic Table;
- the symbols $X^2$ represent:
  - a halogen atom (chlorine, fluorine) with a=0 to 3,
  - an OH functional group with a=0 to 2;
- the symbols R are identical or different and represent: a phenyl radical substituted with at least one electron-attracting group, and/or with at least 2 halogen atoms, and this being when the cationic entity is an onium of an element of groups 15 to 17 of the Periodic Table, a phenyl radical substituted with at least one electron attracting atom or one electron-attracting group, and this being when the cationic entity is an organometallic complex of an element of groups 4 to 10 of the Periodic Table, an aryl radical containing at least two aromatic nuclei optionally substituted with at least one electron attracting atom or one electron-attracting group, regardless of the cationic entity;

said composition comprising, in addition, molecules substituted with hydrolyzable secondary functional groups (SFG) carried by at least one silicon atom per molecule; with the proviso that either said CFGs and said SFGs are carried by different molecules based on silicon, or said composition comprises POS molecules that are substituted both with CFGs and with SFGs and POS molecules substituted only with CFGs;

said antifriction varnish being applied to the (top) layer(s) of silicone elastomer.

17. The varnish support of claim 16, wherein said at least one layer of silicone elastomer can be crosslinked or is at least partially crosslinked, and chosen from the polyaddition or polycondensation RTV silicones, and/or the peroxide HVE silicones, and/or the polyaddition LSR silicones.

18. The varnish support of claim 16, wherein it is intended to be used for the manufacture of inflatable bags for the personal protection of the occupants of vehicles, thermal transfer ribbons or protective wrapping films.

19. An inflatable bag for the personal protection of the occupants of vehicles, produced from the support of claim 16.

20. A thermal transfer ribbon, produced from the support of claim 16.

21. A wrapping film, produced from the support of claim 16.

22. A silicone composition useful for the production of varnish having anti-friction properties, comprising
- at least one polyorganosiloxane (POS) which can be crosslinked by means of crosslinking functional groups (CFG) by the cationic and/or free-radical route,
- molecules substituted with hydrolyzable secondary functional groups (SFG) carried by at least one silicon atom per molecule; with the proviso that either said CFGs and said SFGs are carried by different molecules based on silicon, or said composition comprises POS molecules that are substituted both with CFGs and with SFGs and POS molecules substituted only with CFGs, and
- an effective quantity of a cationic initiator system comprising, as thermal initiator and/or photoinitiator, a product chosen from the onium salts of an element of groups 15 to 17 of the Periodic Table or the salts of an organometallic complex of an element of groups 4 to 10 of the Periodic Table.

* * * * *